(12) United States Patent
Takami

(10) Patent No.: US 9,043,885 B2
(45) Date of Patent: May 26, 2015

(54) SYSTEM FOR PROVIDING CONTENT OR APPLICATION AND CONTROL METHOD THEREFOR, TERMINAL AND CONTROL METHOD THEREFOR, AUTHENTICATION DEVICE AND CONTROL METHOD THEREFOR, PROGRAM, AND INFORMATION STORAGE MEDIUM

(75) Inventor: Shinya Takami, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/129,637

(22) PCT Filed: Feb. 27, 2012

(86) PCT No.: PCT/JP2012/054843
§ 371 (c)(1),
(2), (4) Date: Dec. 27, 2013

(87) PCT Pub. No.: WO2013/001851
PCT Pub. Date: Jan. 3, 2013

(65) Prior Publication Data
US 2014/0123251 A1    May 1, 2014

(30) Foreign Application Priority Data
Jun. 30, 2011    (JP) ................................. 2011-146890

(51) Int. Cl.
*H04L 29/06*    (2006.01)
(52) U.S. Cl.
CPC ............ *H04L 63/08* (2013.01); *H04L 63/0876* (2013.01); *H04L 63/083* (2013.01); *H04L 63/068* (2013.01); *H04L 2463/102* (2013.01)
(58) Field of Classification Search
CPC .............................. H04L 29/06; H04L 63/083
USPC .......................................................... 726/5
See application file for complete search history.

(56) References Cited

U.S. PATENT DOCUMENTS 7,493,493 B2 *   2/2009  Dharmarajan ................. 713/184
7,524,423 B2 *   4/2009  Wittmer et al. ............... 210/695
(Continued)

FOREIGN PATENT DOCUMENTS

JP    2004-282238 A    10/2004

OTHER PUBLICATIONS

International Search Report of PCT/JP2012/054843 dated Mar. 13, 2012.

*Primary Examiner* — Teshome Hailu
*Assistant Examiner* — Thanh Le
(74) *Attorney, Agent, or Firm* — Sughrue Mion, PLLC

(57) ABSTRACT

To provide a system for providing content or an application capable of restricting a terminal device in which the content or the application is able to be used to a single terminal device among one authorized terminal device and one or more unauthorized terminal devices. According to a generation rule, a new authentication symbol string is generated based on at least a part of an authentication symbol string stored in a first authentication symbol string storage unit (100). In a case where the new authentication symbol string belongs to a type of an authentication symbol string that is able to be generated, according to the above mentioned generation rule, based on at least a part of an authentication symbol string stored in a second authentication symbol string storage unit (200) so as to be correlated to terminal identification information, use of content or an application in a terminal device (10) is permitted, and the authentication symbol string stored in the first authentication symbol string storage unit (100) and the authentication symbol string stored in the second authentication symbol string storage unit (200) so as to be correlated to the terminal identification information are updated to the above mentioned new authentication symbol string.

22 Claims, 12 Drawing Sheets

(56) References Cited

U.S. PATENT DOCUMENTS

| | | |
|---|---|---|
| 7,603,369 B2 * | 10/2009 | Koganei et al. ................ 1/1 |
| 7,814,331 B2 * | 10/2010 | Ogawa .......................... 713/184 |
| 8,539,247 B2 * | 9/2013 | Mcgrew et al. ................ 713/183 |
| 2006/0259960 A1 * | 11/2006 | Kondo .............................. 726/6 |

* cited by examiner

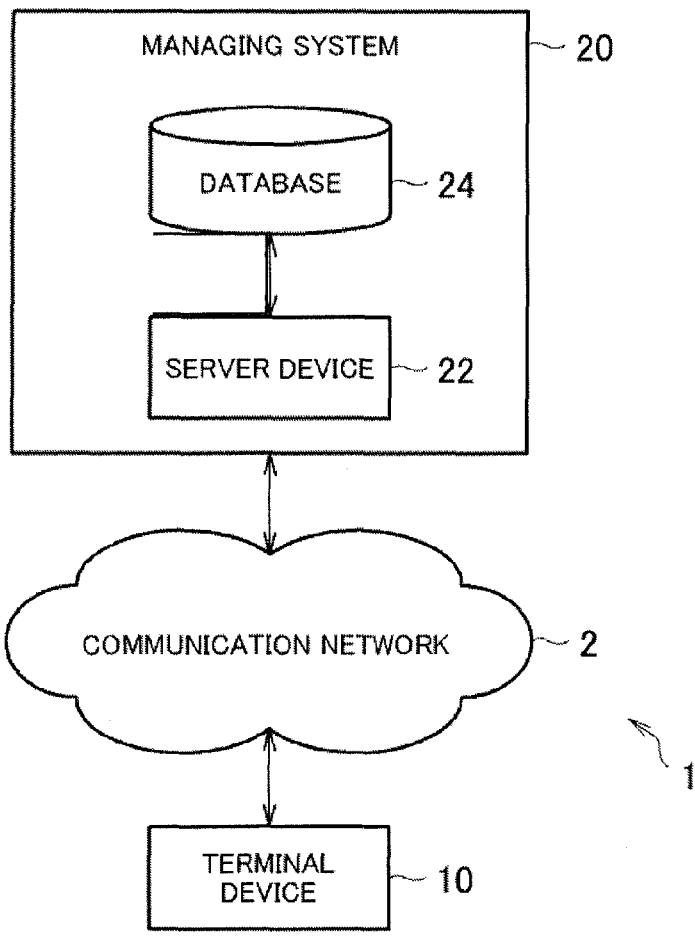
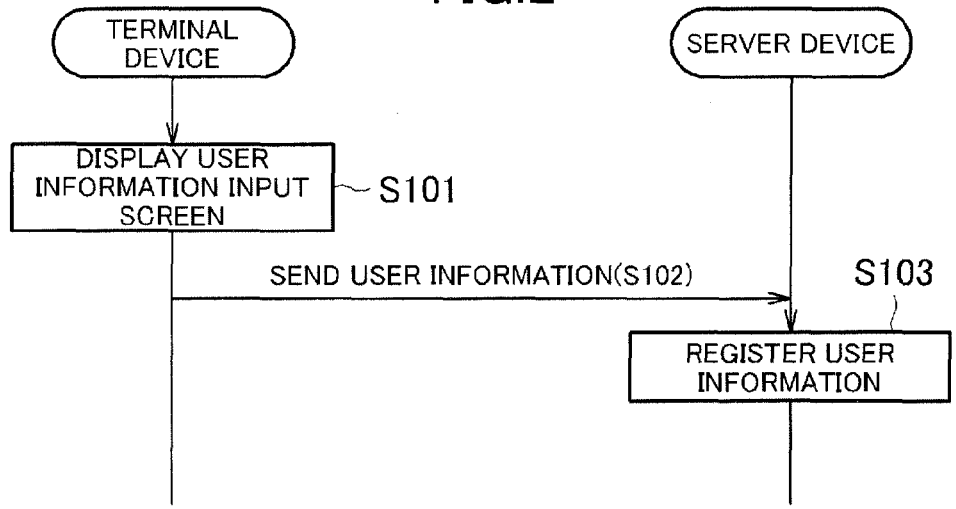

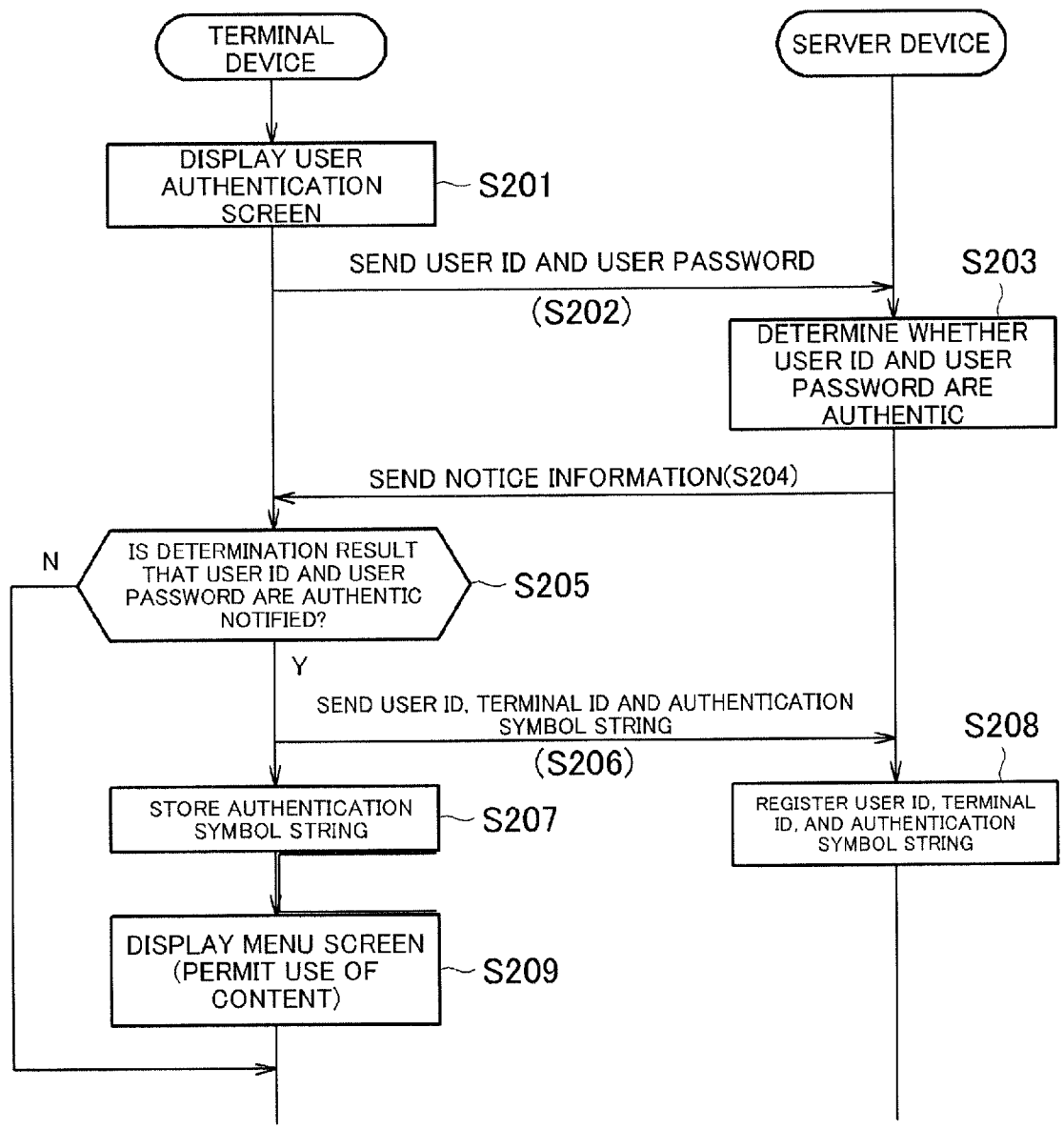

| TERMINAL ID | T00001 |
|---|---|
| AUTHENTICATION SYMBOL STRING | ABCDE |

| USER ID | TERMINAL ID | AUTHENTICATION SYMBOL STRING | CONTENT/APPLICATION INFORMATION |
|---|---|---|---|
| U00001 | T00001 | ABCDE | --- |
| U00002 | T00002 | PQRSTUV | --- |
| ... | ... | ... | ... |

FIG.9

| | AUTHENTICATION SYMBOL STRING | NEW AUTHENTICATION SYMBOL STRING |
|---|---|---|
| EXAMPLE (1) | ABCDE | EXPT4H368B |
| EXAMPLE (2) | ABCDE | DEXPT4H368B |
| EXAMPLE (3) | ABCDE | CEXPT4H368B |
| EXAMPLE (4) | ABCDE (CONVERSION) | FXPT4H368B |
| EXAMPLE (5) | ABCDE (CONVERSION) | FGXPT4H368B |
| EXAMPLE (6) | ABCDE (CONVERSION) | KXPT4H368B |
| EXAMPLE (7) | ABCDE (CONVERSION) | MLSXPT4H368B |

FIG.14

| AUTHENTICATION SYMBOL STRING LENGTH(x) | GENERATION RULE |
|---|---|
| x < Xa | GENERATION RULE A |
| Xa ≦ x | GENERATION RULE B |

FIG.15

| SYMBOL TYPE | GENERATION RULE |
|---|---|
| SYMBOL GROUP A | GENERATION RULE A |
| SYMBOL GROUP B | GENERATION RULE B |

FIG.17

| UPDATE FREQUENCY INFORMATION | 2 |
|---|---|

FIG.18

| UPDATE FREQUENCY(y) | GENERATION RULE |
|---|---|
| y<Ya | GENERATION RULE A |
| Ya≦y | GENERATION RULE B |

FIG.19

| USER ID | TERMINAL ID | AUTHENTICATION SYMBOL STRING | UPDATE FREQUENCY INFORMATION | CONTENT/APPLICATION INFORMATION |
|---|---|---|---|---|
| U00001 | T00001 | ABCDE | 2 | --- |
| U00002 | T00002 | PQRSTUV | 5 | --- |
| ... | ... | ... | ... | ... |

SYSTEM FOR PROVIDING CONTENT OR APPLICATION AND CONTROL METHOD THEREFOR, TERMINAL AND CONTROL METHOD THEREFOR, AUTHENTICATION DEVICE AND CONTROL METHOD THEREFOR, PROGRAM, AND INFORMATION STORAGE MEDIUM

CROSS REFERENCE TO RELATED APPLICATIONS

This is a National Stage of International Application No. PCT/JP2012/054843 filed Feb. 27, 2012, claiming priority based on Japanese Patent Application No. 2011-146890 filed Jun. 30, 2011, the contents of all of which are incorporated herein by reference in their entirety.

TECHNICAL FIELD

The present invention relates to a system for providing content or an application (a content or application providing system), a control method for the content or application providing system, a terminal device, a control method for the terminal device, an authentication device, a control method for the authentication device, a program, and an information storage medium.

BACKGROUND ART

There is known a system for providing a user with content or an application. In such a system, content or an application is downloaded to a terminal device to be used therein. That is, in the terminal device, content, such as an image, a video, an electronic book, or the like, is displayed on a display unit, content, such as music, or the like, is output from a sound output unit, or an application is executed. In other words, a user in a terminal device sees and listens to content, such as an image, a video, music, or the like, reads content, such as an electronic book, or the like, and uses an application.

With respect to the above described content system, there has been proposed a technique for restricting use of content or an application copied to a terminal device (hereinafter referred to as an "unauthorized terminal device") other than a terminal device (hereinafter referred to as an "authorized terminal device") that is authentically allowed to use the content or application. Specifically, for example, there has been proposed a technique for checking in a server device, a combination of the ID of a terminal device and that of content or an application when using the content or application in the terminal device, with the ID of the terminal device being stored so as to be correlated to the ID of content or an application available for authentic use in the terminal device, so that use of the content or application in a unauthorized terminal device is restricted.

CITATION LIST

Patent Literature

Patent Literature 1: JP 2004-282238 A

SUMMARY OF INVENTION

Technical Problem

However, according to the above-described technique, in a case where content or an application is copied to an unauthorized terminal device, and the ID of an authorized terminal device is impersonated as the ID of the unauthorized terminal device, it is not possible to restrict use of the content or application in the unauthorized terminal device. As a result, a case may be resulted in which the content or application can be used in a plurality of terminal devices including a single authorized terminal device and one or more unauthorized terminal devices. That is, a case may be resulted in which content or an application can be used in two or more terminal devices, though there is only one authorized terminal device.

The present invention has been conceived in view of the above, and an object thereof is to provide a content or application providing system, a control method therefor, a terminal device, a control method therefor, an authentication device, a control method therefor, a program, and an information storage medium capable of restricting a terminal device allowed to use content or an application to a single terminal device among one authorized terminal device and one or more unauthorized terminal devices.

Solution to Problem

In order to achieve the above described object, a system for providing content or an application according to the present invention is a system for providing content or an application including a terminal device for a user to use the content or the application and an authentication system, wherein the terminal device includes first authentication symbol string storage means for storing an authentication symbol string, authentication symbol string generation means for generating a new authentication symbol string based on at least a part of the authentication symbol string stored in the first authentication symbol string storage means, according to a generation rule for generating a new authentication symbol string based on an authentication symbol string, and an authentication information transmission means for sending terminal identification information for identifying the terminal device and the new authentication symbol string generated by the authentication symbol string generation means to the authentication system, the authentication system includes second authentication symbol string storage means for storing an authentication symbol string so as to be correlated to the terminal identification information, authentication information receiving means for receiving the terminal identification information and the new authentication symbol string sent by the authentication information transmission means, determination means for determining whether or not the new authentication symbol string received by the authentication information receiving means belongs to a type of an authentication symbol string that is able to be generated, according to the generation rule, based on at least a part of the authentication symbol string stored in the second authentication symbol string storage means so as to be correlated to the terminal identification information received by the authentication information receiving means, notice information transmission means for sending notice information for permitting use of the content or the application in the terminal device to the terminal device in a case where the determination means determines that the new authentication symbol string received by the authentication information receiving means belongs to the type, and second authentication symbol string update means for updating the authentication symbol string stored in the second authentication symbol string storage means so as to be correlated to the terminal identification information received by the authentication information receiving means to the new authentication symbol string received by the authentication information receiving means, in the case where the determination means determines that the new authentication symbol string received by the authentication information receiving means belongs to the type, the terminal device further includes notice information receiving means for receiving the notice information sent by the notice information transmission means, permitting means for permitting use of the content or the application, based on the notice information received by the notice information receiving means, and first authentication symbol string update means for updating the authentication symbol string stored in the first authentication symbol string storage means to the new authentication symbol string generated by the authentication symbol string generation means, in the case where the determination means determines that the new authentication symbol string received by the authentication information receiving means belongs to the type.

Note that in the claims, specification, drawings, and abstract of this application, a "symbol" refers to a symbol in a broader sense, including, for example, a character and a reference mark (a symbol in a narrower sense). Thus, a "symbol string" includes a "character string". Further, a "symbol string" includes a symbol string constituted of one symbol (that is, a single symbol) as well.

A control method for a system for providing content or an application according to the present invention is a control method for a system for providing content or an application including a terminal device for a user to use the content or the application and an authentication system, including: a step of obtaining by the terminal device, an authentication symbol string stored in first authentication symbol string storage means for storing the authentication symbol string; an authentication symbol string generation step of generating by the terminal device, a new authentication symbol string based on at least a part of the authentication symbol string stored in the first authentication symbol string storage means, according to a generation rule for generating a new authentication symbol string based on an authentication symbol string; an authentication information transmission step of sending by the terminal device, terminal identification information for identifying the terminal device and the new authentication symbol string generated at the authentication symbol string generation step to the authentication system; a step of obtaining by the authentication system, at least a part of content stored in second authentication symbol string storage means for storing an authentication symbol string so as to be correlated to the terminal identification information; an authentication information receiving step of receiving by the authentication system, the terminal identification information and the new authentication symbol string sent at the authentication information transmission step; a determination step of determining by the authentication system, whether or not the new authentication symbol string received at the authentication information receiving step belongs to a type of an authentication symbol string that is able to be generated, according to the generation rule, based on at least a part of the authentication symbol string stored in the second authentication symbol string storage means so as to be correlated to the terminal identification information received at the authentication information receiving step; a notice information transmission step of sending by the authentication system, notice information for permitting use of the content or the application in the terminal device to the terminal device in a case where it is determined at the determination step that the new authentication symbol string received at the authentication information receiving step belongs to the type; a second authentication symbol string update step of updating by the authentication system, the authentication symbol string stored in the second authentication symbol string storage means so as to be correlated to the terminal identification information received at the authentication information receiving step to the new authentication symbol string received at the authentication information receiving step, in the case where it is determined at the determination step that the new authentication symbol string received at the authentication information receiving step belongs to the type; a notice information receiving step of receiving by the terminal device, the notice information sent at the notice information transmission step; a permitting step of permitting by the terminal device, use of the content or the application, based on the notice information received at the notice information receiving step; and a first authentication symbol string update step of updating by the terminal device, the authentication symbol string stored in the first authentication symbol string storage means to the new authentication symbol string generated at the authentication symbol string generation step, in the case where it is determined at the determination step that the new authentication symbol string received at the authentication information receiving step belongs to the type.

A terminal device according to the present invention is a terminal device for a user to use content or an application, connected for communication to an authentication system, including: authentication symbol string storage means for storing an authentication symbol string; authentication symbol string generation means for generating a new authentication symbol string based on at least a part of the authentication symbol string stored in the authentication symbol string storage means, according to a generation rule for generating a new authentication symbol string based on an authentication symbol string; authentication information transmission means for sending terminal identification information for identifying the terminal device and the new authentication symbol string generated by the authentication symbol string generation means to the authentication system; means for receiving notice information sent from the authentication system in a case where it is determined in the authentication system that the new authentication symbol string sent from the authentication information transmission means belongs to a type of an authentication symbol string that is able to be generated, according to the generation rule, based on at least a part of an authentication symbol string stored in the authentication system so as to be correlated to the terminal identification information sent by the authentication information transmission means; permitting means for permitting use of the content or the application, based on the notice information; and authentication symbol string update means for updating the authentication symbol string stored in the authentication symbol string storage means to the new authentication symbol string generated by the authentication symbol string generation means in the case where it is determined in the authentication system that the new authentication symbol string sent from the authentication information transmission means belongs to the type.

A control method for a terminal device according to the present invention is a control method for a terminal device for a user to use content or an application, connected for communication to an authentication system, the control method including: a step of obtaining an authentication symbol string stored in authentication symbol string storage means for storing the authentication symbol string; an authentication symbol string generation step of generating a new authentication symbol string based on at least a part of the authentication symbol string stored in the authentication symbol string storage means, according to a generation rule for generating a new authentication symbol string based on an authentication symbol string; an authentication information transmission step of sending terminal identification information for identifying the terminal device and the new authentication symbol string generated at the authentication symbol string generation step to the authentication system; a step of receiving notice information sent from the authentication system in a case where it is determined in the authentication system that the new authentication symbol string sent at the authentication information transmission step belongs to a type of an authentication symbol string that is able to be generated, according to the generation rule, based on at least apart of an authentication symbol string stored in the authentication system so as to be correlated to the terminal identification information sent at the authentication information transmission step; a permitting step of permitting use of the content or the application, based on the notice information; and an authentication symbol string update step of updating the authentication symbol string stored in the authentication symbol string storage means to the new authentication symbol string generated at the authentication symbol string generation step in the case where it is determined in the authentication system that the new authentication symbol string sent at the authentication information transmission step belongs to the type.

A program according to the present invention is a program for causing a computer to function as a terminal device for a user to use content or an application, connected for communication to an authentication system, the program for causing the computer to function as: means for obtaining an authentication symbol string stored in an authentication symbol string storage means for storing the authentication symbol string; authentication symbol string generation means for generating a new authentication symbol string based on at least a part of the authentication symbol string stored in the authentication symbol string storage means, according to a generation rule for generating a new authentication symbol string based on an authentication symbol string; authentication information transmission means for sending terminal identification information for identifying the terminal device and the new authentication symbol string generated by the authentication symbol string generation means to the authentication system; means for receiving notice information sent from the authentication system in a case where it is determined in the authentication system that the new authentication symbol string sent from the authentication information transmission means belongs to a type of an authentication symbol string that is able to be generated, according to the generation rule, based on at least a part of an authentication symbol string stored in the authentication system so as to be correlated to the terminal identification information sent by the authentication information transmission means; permitting means for permitting use of the content or the application, based on the notice information; and authentication symbol string update means for updating the authentication symbol string stored in the authentication symbol string storage means to the new authentication symbol string generated by the authentication symbol string generation means in the case where it is determined in the authentication system that the new authentication symbol string sent from the authentication information transmission means belongs to the type.

An information storage medium according to the present invention is a computer readable information storage medium storing the above described program.

An authentication device according to the present invention is an authentication device connected for communication to a terminal device for a user to use content or an application, including: means for obtaining at least a part of content stored in an authentication symbol string storage means for storing an authentication symbol string so as to be correlated to terminal identification information for identifying the terminal device; authentication information receiving means for receiving from the terminal device, the terminal identification information and a new authentication symbol string generated based on at least a part of an authentication symbol string stored in the terminal device, according to a generation rule for generating a new authentication symbol string based on an authentication symbol string; determination means for determining whether or not the new authentication symbol string received by the authentication information receiving means belongs to a type of an authentication symbol string that is able to be generated, according to the generation rule, based on at least a part of the authentication symbol string stored in the authentication symbol string storage means so as to be correlated to the terminal identification information received by the authentication information receiving means; notice information transmission means for sending notice information for permitting use of the content or the application in the terminal device to the terminal device in a case where the determination means determines that the new authentication symbol string received by the authentication information receiving means belongs to the type; and authentication symbol string update means for updating the authentication symbol string stored in the authentication symbol string storage means so as to be correlated to the terminal identification information received by the authentication information receiving means to the new authentication symbol string received by the authentication information receiving means, in the case where the determination means determines that the new authentication symbol string received by the authentication information receiving means belongs to the type.

A control method for an authentication device according to the present invention is a control method for an authentication device connected for communication to a terminal device for a user to use content or an application, the control method including: a step of obtaining at least a part of content stored in an authentication symbol string storage means for storing an authentication symbol string so as to be correlated to terminal identification information for identifying the terminal device; an authentication information receiving step of receiving from the terminal device, the terminal identification information and a new authentication symbol string generated based on at least a part of an authentication symbol string stored in the terminal device, according to a generation rule for generating a new authentication symbol string based on an authentication symbol string; a determination step of determining whether or not the new authentication symbol string received at the authentication information receiving step belongs to a type of an authentication symbol string that is able to be generated, according to the generation rule, based on at least a part of the authentication symbol string stored in the authentication symbol string storage means so as to be correlated to the terminal identification information received at the authentication information receiving step; a notice information transmission step of sending notice information for permitting use of the content or the application in the terminal device to the terminal device in a case where it is determined at the determination step that the new authentication symbol string received at the authentication information receiving step belongs to the type; and an authentication symbol string update step of updating the authentication symbol string stored in the authentication symbol string storage means so as to be correlated to the terminal identification information received at the authentication information receiving step to the new authentication symbol string received at the authentication information receiving step, in the case where it is determined at the determination step that the new authentication symbol string received at the authentication information receiving step belongs to the type.

A program according to the present invention is a program for causing a computer to function as an authentication device connected for communication to a terminal device for a user to use content or an application, the program for causing the computer to function as means for obtaining at least a part of content stored in authentication symbol string storage means for storing an authentication symbol string so as to be correlated to terminal identification information for identifying the terminal device; authentication information receiving means for receiving from the terminal device, the terminal identification information and a new authentication symbol string generated based on at least a part of an authentication symbol string stored in the terminal device, according to a generation rule for generating a new authentication symbol string based on an authentication symbol string; determination means for determining whether or not the new authentication symbol string received by the authentication information receiving means belongs to a type of an authentication symbol string that is able to be generated, according to the generation rule, based on at least a part of the authentication symbol string stored in the authentication symbol string storage means so as to be correlated to the terminal identification information received by the authentication information receiving means; notice information transmission means for sending notice information for permitting use of the content or the application in the terminal device to the terminal device in a case where the determination means determines that the new authentication symbol string received by the authentication information receiving means belongs to the type; and authentication symbol string update means for updating the authentication symbol string stored in the authentication symbol string storage means so as to be correlated to the terminal identification information received by the authentication information receiving means to the new authentication symbol string received by the authentication information receiving means, in the case where the determination means determines that the new authentication symbol string received by the authentication information receiving means belongs to the type.

An information storage medium according to the present invention is a computer readable information storage medium storing the above described program.

According to one aspect of the present invention, the terminal device may further include first generation rule information storage means for storing generation rule information for collating information on an authentication symbol string and a generation rule for generating a new authentication symbol string based on an authentication symbol string, the authentication symbol string generation means may specify a generation rule correlated to the authentication symbol string stored in the first authentication symbol string storage means, based on the generation rule information stored in the first generation rule information storage means, and generates the new authentication symbol string based on at least a part of the authentication symbol string stored in the first authentication symbol string storage means, according to the generation rule, the authentication system may further include second generation rule information storage means for storing the generation rule information stored in the first generation rule information storage means, and the determination means may specify a generation rule correlated to the authentication symbol string stored in the second authentication symbol string storage means, based on the generation rule information stored in the second generation rule information storage means, and determines whether or not the new authentication symbol string received by the authentication information receiving means belongs to a type of an authentication symbol string that is able to be generated, according to the generation rule, based on at least a part of the authentication symbol string stored in the second authentication symbol string storage means so as to be correlated to the terminal identification information received by the authentication information receiving means.

According to one aspect of the present invention, the generation rule information may be information for correlating a length of an authentication symbol string and a generation rule for generating a new authentication symbol string based on an authentication symbol string, the authentication symbol string generation means may generate the new authentication symbol string based on at least a part of the authentication symbol string stored in the first authentication symbol string storage means, according to a generation rule correlated to a length of the authentication symbol string stored in the first authentication symbol string storage means, and the determination means may determine whether or not the new authentication symbol string received by the authentication information receiving means belongs to a type of an authentication symbol string that is able to be generated, according to a generation rule correlated to a length of the authentication symbol string stored in the second authentication symbol string storage means, based on at least a part of the authentication symbol string stored in the second authentication symbol string storage means so as to be correlated to the terminal identification information received by the authentication information receiving means.

According to one aspect of the present invention, the generation rule information may be information for correlating a type of a symbol at a predetermined position in an authentication symbol string and a generation rule for generating a new authentication symbol string based on an authentication symbol string, the authentication symbol string generation means may generate the new authentication symbol string based on at least a part of the authentication symbol string stored in the first authentication symbol string storage means, according to a generation rule correlated to a type of a symbol at the predetermined position in the authentication symbol string stored in the first authentication symbol string storage means, and the determination means may determine whether or not the new authentication symbol string received by the authentication information receiving means belongs to a type of an authentication symbol string that is able to be generated, according to a generation rule correlated to a type of a symbol at the predetermined position in the authentication symbol string stored in the second authentication symbol string storage means, based on at least a part of the authentication symbol string stored in the second authentication symbol string storage means so as to be correlated to the terminal identification information received by the authentication information receiving means.

According to one aspect of the present invention, the terminal device may further include means for guiding the user to input user identification information for identifying the user and a user password, and means for sending the user identification information and the user password input by the user to the authentication system, the authentication system may further include user authentication information storage means for storing a combination of the user identification information and the user password, and means for determining whether or not the combination of the user identification information and the user password sent from the terminal device is any of combinations of user identification information and a user password stored in the user authentication information storage means, and the authentication system may set the authentication symbol string stored in the first authentication symbol string storage means and the authentication symbol string stored in the second authentication symbol string storage means so as to be correlated to terminal identification information correlated to the user identification information sent from the terminal device, to a same authentication symbol string in a case where it is determined that the combination of the user identification information and the user password sent from the terminal device is any of the combinations of the user identification information and the user password stored in the user authentication information storage means.

According to one aspect of the present invention, the terminal device may further include first update frequency information storage means for storing update frequency information concerning a number of times at which the authentication symbol string stored in the first authentication symbol string storage means is updated, and first generation rule information storage means for storing generation rule information for correlating a number of times at which an authentication symbol string is updated and a generation rule for generating a new authentication symbol string based on an authentication symbol string, the authentication symbol string generation means may specify a generation rule correlated to the update frequency information stored in the first update frequency information storage means, based on the generation rule information stored in the first generation rule information storage means, and generates the new authentication symbol string based on at least a part of the authentication symbol string stored in the first authentication symbol string storage means, according to the generation rule, the authentication system may further include second update frequency information storage means for storing update frequency information so as to be correlated to the terminal identification information, the update frequency information concerning a number of times at which the authentication symbol string stored in the second authentication symbol string storage means so as to be correlated to the terminal identification information is updated, and second generation rule information storage means for storing the generation rule information stored in the first generation rule information storage means, and the determination means may specify a generation rule correlated to the update frequency information stored in the second update frequency information storage means so as to be correlated to the terminal identification information received by the authentication information receiving means, based on the generation rule information stored in the second generation rule information storage means, and determines whether or not the new authentication symbol string received by the authentication information receiving means belongs to a type of an authentication symbol string that is able to be generated, according to the generation rule, based on at least a part of the authentication symbol string stored in the second authentication symbol string storage means so as to be correlated to the terminal identification information received by the authentication information receiving means.

According to one aspect of the present invention, the terminal device may include means for guiding the user to input user identification information for identifying the user and a user password, and means for sending the user identification information and the user password input by the user to the authentication device, the authentication system may further include a user authentication information storage means for storing a combination of the user identification information and the user password, and means for determining whether or not the combination of the user identification information and the user password sent from the terminal device is any of combinations of user identification information and a user password stored in the user authentication information storage means, and the authentication system may set the authentication symbol string stored in the first authentication symbol string storage means and the authentication symbol string stored in the second authentication symbol string storage means so as to be correlated to terminal identification information correlated to the user identification information sent from the terminal device, to a same authentication symbol string, and sets the update frequency information stored in the first update frequency information storage means and the update frequency information stored in the second update frequency information storage means so as to be correlated to the terminal identification information correlated to the user identification information sent from the terminal device, to a same update frequency, in a case where it is determined that the combination of the user identification information and the user password sent from the terminal device is any of the combinations of the user identification information and the user password stored in the user authentication information storage means.

According to one aspect of the present invention, the generation rule may include a rule in which a symbol at which position in an authentication symbol string is to be extracted, and the authentication symbol string generation means may include extraction means for extracting, according to the generation rule, one or more symbols from the authentication symbol string stored in the first authentication symbol string storage means, and generates the new authentication symbol string based on the one or more symbols extracted by the extraction means.

According to one aspect of the present invention, the generation rule may include at least one of a rule for converting one symbol in an authentication symbol string into one symbol, a rule for converting one symbol in an authentication symbol string into a plurality of symbols, a rule for converting a plurality of symbols in an authentication symbol string to one symbol, and a rule for converting a plurality of symbols in an authentication symbol string into a plurality of symbols, and the authentication symbol string generation means may include conversion means for converting at least a part of the authentication symbol string stored in the first authentication symbol string storage means according to the generation rule to obtain one or more symbols, and generates the new authentication symbol string based on the one or more symbols obtained by the conversion means.

According to one aspect of the present invention, the generation rule may include a rule in which one or more symbols based on at least a part of an authentication symbol string is/are to be included in which one or more positions in the new authentication symbol string, and the authentication symbol string generation means may generate, according to the generation rule, a symbol string including one or more symbols based on at least a part of the authentication symbol string stored in the first authentication symbol string storage means as the new authentication symbol string.

Advantageous Effects of Invention

According to the present invention, it is possible to restrict a terminal device in which content or an application can be used to a single terminal device among one authorized terminal device and one or more unauthorized terminal devices.

BRIEF DESCRIPTION OF DRAWINGS

FIG. 1 shows an overall structure of a content or application providing system according to an embodiment of the present invention;

FIG. 2 shows one example of processing executed in the content or application providing system;

FIG. 3 shows one example of a user table;

FIG. 4 shows one example of processing executed in the content or application providing system;

FIG. 9 explains an example of a generation rule;

FIG. 14 shows one example of generation rule information;

FIG. 15 shows another example of the generation rule information;

FIG. 17 shows one example of update frequency information stored in a first update frequency information storage unit;

FIG. 18 shows one example of generation rule information; and

FIG. 19 shows one example of a terminal table.

DESCRIPTION OF EMBODIMENTS

Figures 5, 6, 7:
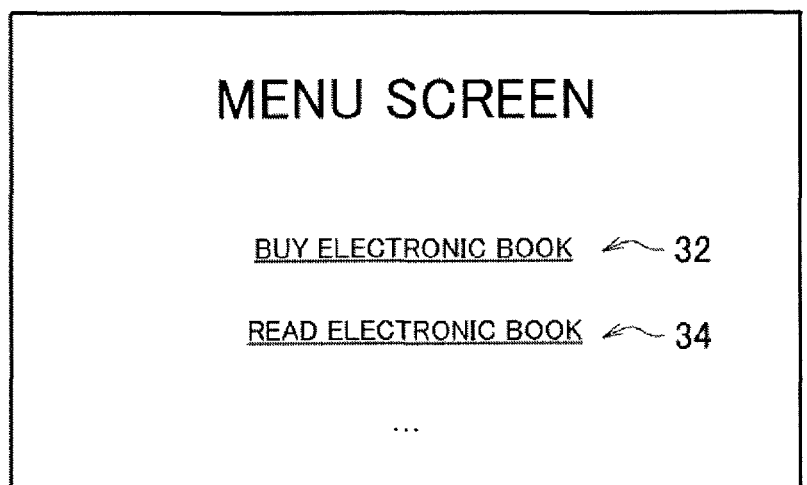
FIG. 5 shows one example of data stored in an auxiliary storage unit of a terminal device.
FIG. 6 shows one example of a terminal table.
FIG. 7 shows one example of a menu screen.

In the following, examples of embodiments of the present invention will be described in detail with reference to the accompanying drawings.

First Embodiment

FIG. 1 shows an overall structure of a content or application providing system according to a first embodiment of the present invention. As shown in FIG. 1, a content or application providing system 1 according to the first embodiment includes a terminal device 10 and a managing system 20 (an authentication system). The terminal device 10 and the managing system 20 are connected to a communication network 2 including, for example, the Internet, or the like, and can execute data communication with each other.

The managing system 20 includes one or more server computers. In the example shown in FIG. 1, the managing system 20 includes a server device 22 (an authentication device) and a database 24. The server device 22 is a device for providing content to the terminal device 10. "Content" refers to, for example, an electronic book, an image, a video, music, a game, or the like. The server device 22 executes processing based on a processing request received from the terminal device 10. For example, the server device 22 has a control unit (for example, a CPU or the like), a main memory unit (for example, a RAM or the like), an auxiliary storage unit (for example, a hard disk or a solid state drive), an optical disk drive for reading a program and data stored in an optical disk (an information storage medium), and a communication interface.

The control unit executes processing according to a program stored in the auxiliary storage unit. For example, a program and data is supplied via an optical disk (an information storage medium) to the auxiliary storage unit of the server device 22. That is, an optical disk storing a program and data is mounted in the optical disk drive, and the program and data stored in the optical disk is read by the optical disk drive to be stored in the auxiliary storage unit. Note that a program and data may be supplied to the auxiliary storage unit via an information storage medium (for example, a memory card) other than an optical disk. Further, a program and data may be supplied to the auxiliary storage unit via the communication network 2.

The server device 22 can access the database 24. In the database 24, for example, data on a user using the content or application providing system 1, data on content provided by the content or application providing system 1, and so forth are stored. Note that the database 24 may be built in a server computer other than the server device 22 or in the server computer 22.

The terminal device 10 is an information processing device on which a user uses content or an application. The terminal device 10 is, for example, a personal computer, a portable phone, a portable information terminal, or the like. For example, the terminal device 10 has a control unit (for example, a CPU), a main memory unit (for example, a RAM), an auxiliary storage unit (for example, a hard disk or a solid state drive), an optical disk drive, an operation unit, a display unit (for example, a liquid crystal display), a sound output unit (for example, a speaker), and a communication interface.

Note that, for example, a program and data is supplied to the auxiliary storage unit of the terminal device 10 via an optical disk (an information storage medium). That is, an optical disk storing a program and data is mounted in the optical disk drive, and the program and data stored in the optical disk is read by the optical disk drive to be stored in the auxiliary storage unit. Note that a program and data may be supplied to the auxiliary storage unit via an information storage medium (for example, a memory card) other than an optical disk. Further, a program and data may be supplied to the auxiliary storage unit via the communication network 2.

In this embodiment, for example, a daemon program (for example, an HTTP daemon) is activated in the server device 22. Further, a program for accessing the server device 22 is activated in the terminal device 10. According to the program, a processing request (for example, an HTTP request) is sent from the terminal device 10 to the server device 22. Then, a processing result (for example, an HTTP response) in response to the above-described processing request is sent from the server device 22 to the terminal device 10. For example, page data written in a predetermined descriptive language (for example, web page descriptive language) is sent to the terminal device 10, and a screen based on the processing result is displayed on the display unit of the terminal device 10, based on the page data.

In the above-described content or application providing system 1, content or an application is sold. For example, content data that can be reproduced according to a predetermined program that is pre-installed in the terminal device 10 is sold. Note that application software including a program for reproducing content data and content data may be sold. Alternatively, a program for reproducing content data may be sold by itself as an application. Still alternatively, other applications (for example, an editor or the like) may be sold. Note that, in the following, for brevity of description, a case will be mainly described in which an "electronic book" that can be displayed according to a pre-installed program in the terminal device 10 is sold.

A user using the content or application providing system 1 is first required to complete user registration. FIG. 2 shows one example of processing executed for user registration.

As shown in FIG. 2, initially, the control unit of the terminal device 10 displays a user information input screen (not shown) on the display unit of the terminal device 10 (S101). The user information input screen is a screen in which a user inputs information on himself/herself. Specifically, in the user information input screen, a user inputs, for example, an ID, a password, a name, an address, credit card information, and so forth. Note that the ID of a user may be set desirably or automatically by the content or application providing system 1.

The control unit of the terminal device 10 sends the user information input in the user information input screen to the server device 22 (S102). Upon receipt of the user information in the server device 22, the control unit of the server device 22 registers the received user information in the database 24 (S103).

FIG. 3 shows one example of a user table stored in the database 24. The user table is a table for storing user information input in the user information input screen. The user table shown in FIG. 3 includes "user ID", "user password", "name", "address", and "credit card information" fields. At step S103, the control unit adds a new record to the user table. Then, the control unit registers the user information received from the terminal device 10 in the respective fields of the newly added record. The above completes user registration.

FIG. 4 explains processing executed at initial access to the server device 22 by the terminal device 10 after completion of user registration.

As shown in FIG. 4, initially, the control unit of the terminal device 10 displays a user authentication screen image (not shown) on the display unit of the terminal device 10 (S201). Note that the user authentication screen is a screen for inputting a user ID and a user password, in which a user is guided to input his/her user ID and user password. The control unit of the terminal device sends the user ID and user password input in the user authentication screen to the server device 22 (S202).

Upon receipt of the user ID and user password in the server device 22, the control unit of the server device 22 determines whether or not the combination of the received user ID and user password is authentic (S203). That is, the control unit of the server device 22 determines whether or not the combination of the received user ID and user password is registered in the user table. When the combination of the received user ID and user password is registered in the user table, the server device 22 determines that the combination of the received user ID and user password is authentic.

Then, the control unit of the server device 22 sends notice information to notify of a result of determination at step S203 to the terminal device 10 (S204). Upon receipt of the notice information in the terminal device 10, the control unit of the terminal device 10 determines whether or not a determination result to the effect that the combination of the user ID and user password is authentic has been notified (S205).

Upon notice of a determination result to the effect that the combination of the user ID and user password is authentic, the control unit of the terminal device 10 reads a terminal ID (terminal identification information) stored in advance in the auxiliary storage unit. A "terminal ID" is identification information unique to each terminal device 10. In addition, the control unit automatically generates an authentication symbol string. An "authentication symbol string" is a symbol string automatically generated by the terminal device 10 to serve as a password correlated to each terminal ID. Note that, as described above, a "symbol" refers to a symbol in a broader sense, including, for example, a character, a reference mark (a symbol in a narrower sense), and so froth. Thus, a "symbol string" includes a "character string". A "symbol string" also includes a symbol string constituted of one symbol (that is, a single symbol).

Then, the control unit of the terminal device 10 sends the user ID, the terminal ID, and the authentication symbol string to the server device 22 (S206). In addition, the control unit of the terminal device 10 stores the authentication symbol string sent to the server device 22 in the auxiliary storage unit (S207). For example, the authentication symbol string is stored together with the terminal ID. That is, for example, data such as is shown in FIG. 5 is stored in the auxiliary storage unit of the terminal device 10.

Upon receipt of the user ID, the terminal ID, and the authentication symbol string in the server device 22, the control unit of the server device 22 registers the received user ID, terminal ID, and authentication symbol string in the database 24 (S208).

FIG. 6 shows one example of a terminal table stored in the database 24. The terminal table shown in FIG. 6 includes "user ID", "terminal ID", "authentication symbol string", and "content/application information" fields. For example, a list of IDs of content (for example, an electronic book) or applications that are authentically usable in each terminal device 10 is registered in the "content/application information" field.

At step S208, the control unit of the server device 22 newly adds a record to the terminal table. Then, the control unit registers the user ID, the terminal ID, and the authentication symbol string all received from the terminal device 10 in the respective "user ID", "terminal ID", and "authentication symbol string" fields of the newly added record.

In the terminal device 10, after storing the authentication symbol string sent to the server device 22 in the auxiliary storage unit, a menu screen is displayed on the display unit (S209). FIG. 7 shows one example of the menu screen. In the menu screen 30 shown in FIG. 7, a link button 32 for buying an electronic book (content) and a link button 34 for reading an electronic book bought are displayed.

Upon selection of the link button 32 by a user, a purchase screen (not shown) for buying an electronic book is displayed on the display unit of the terminal device 10. For example, a list of electronic books available in the content or application providing system 1 is displayed in the purchase screen. Then, a user selects his/her desired electronic book in the electronic book list displayed in the purchase screen. Upon selection of the user's desired electronic book, purchase processing (settlement processing) is executed, followed by downloading the electronic book to the terminal device 10. The downloaded electronic book is stored in the auxiliary storage unit of the terminal device 10. Note that when an electronic book is purchased, the ID of the purchased electronic book is additionally registered in the "content/application information" field of the terminal table.

Upon selection of the link button 34 by a user, a reading screen (not shown) for reading an electronic book is displayed on the display unit of the terminal device 10. For example, a list of the electronic books stored in the auxiliary storage unit of the terminal device 10 is displayed in the reading screen. Then, the user selects his/her desired electronic book in the electronic book list displayed in the reading screen. Upon selection of the user's desired electronic book, content of the selected electronic book is displayed. In this manner, the user can read his/her desired electronic book.

Note here that processing executed at initial access to the server device 22 by the terminal device 10 after completion of user registration is described referring to FIG. 4. At initial access to the server device 22 by the terminal device 10, the user authentication screen is displayed so that a user is requested to input a user ID and a user password. Meanwhile, at second and thereafter accesses, on principle, the user authentication screen is not displayed. That is, a user is not requested to input a user ID and a user password as user convenience is improved. Specifically, at second and thereafter accesses, whether or not the terminal device 10 is authentic is determined based on the terminal ID and the authentication symbol string (see FIG. 5) instead of a user ID and a user password. Then, use of content or an application in that terminal device 10 is permitted, based on the result of the determination (see FIG. 10 to be described later).

Note here that, according to a conventional content or application providing system, there has been a case in which content or an application is used in two or more terminal devices (that is, one authorized terminal device and one or more unauthorized terminal devices) even though there is only one authorized terminal device that is authentically allowed to use the content or application, as described above. On the other hand, according to the content or application providing system 1 according to this embodiment, it is possible to restrict a terminal device allowed to use content or an application to a single terminal device among one authorized terminal device and one or more unauthorized terminal devices. Below, a structure for achieving such restriction will be described.

Figure 8:
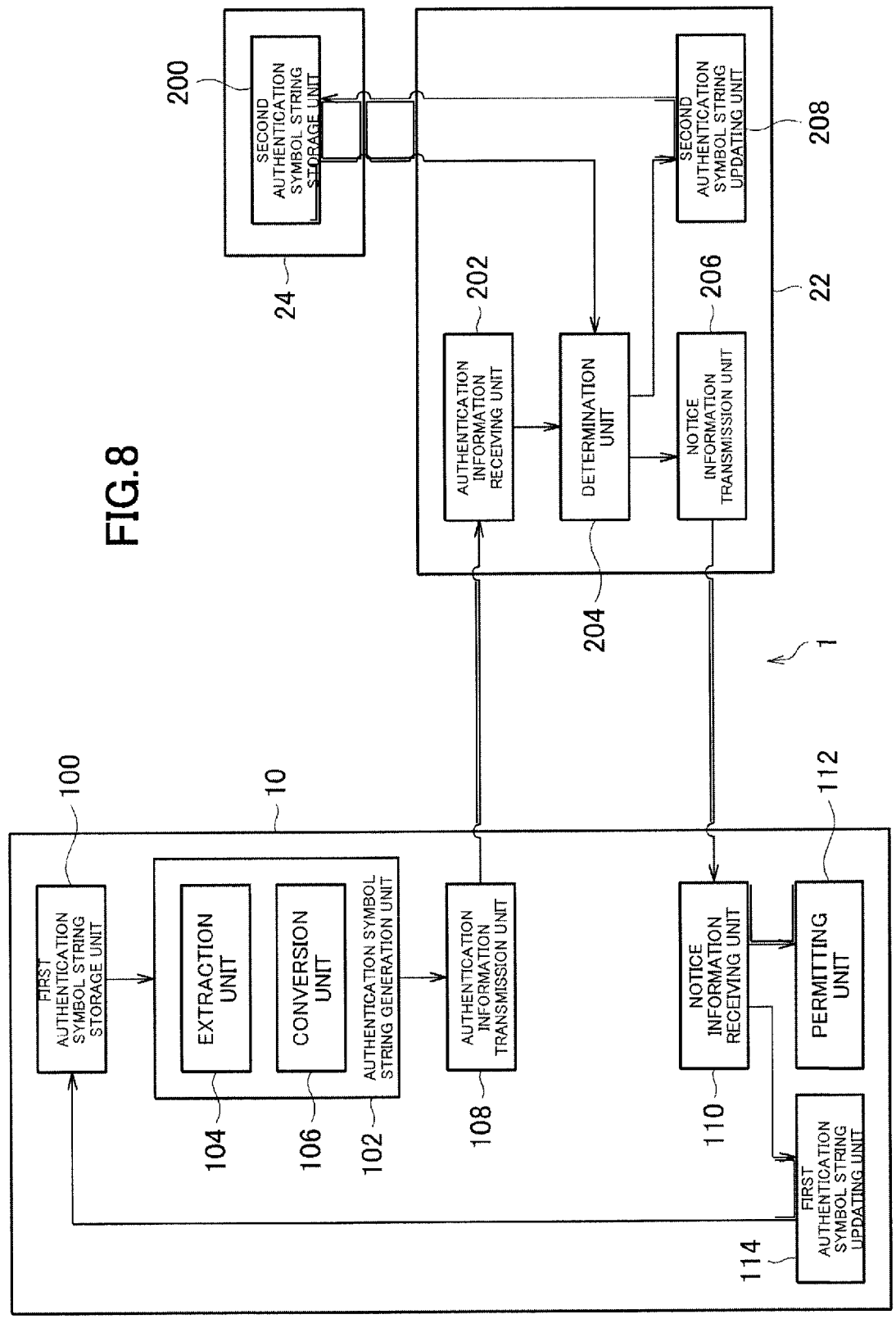
FIG. 8 is a functional block diagram of a content or application providing system according to a first embodiment.

FIG. 8 is a functional block diagram showing a functional block relevant to the present invention among those achieved in the content or application providing system 1 according to this embodiment.

As shown in FIG. 8, the content or application providing system 1 includes a first authentication symbol string storage unit 100, an authentication symbol string generation unit 102, an authentication information transmission unit 108, a notice information receiving unit 110, a permitting unit 112, and a first authentication symbol string updating unit 114. For example, the first authentication symbol string storage unit 100 is implemented using the auxiliary storage unit of the terminal device 10. A functional block other than the first authentication symbol string storage unit 100 is implemented by the control unit of the terminal device 10. That is, the control unit of the terminal device 10 executes processing according to a program, thereby functioning as a functional block other than the first authentication symbol string storage unit 100.

The content or application providing system 1 further includes a second authentication symbol string storage unit 200, an authentication information receiving unit 202, a determination unit 204, a notice information transmission unit 206, and a second authentication symbol string updating unit 208. For example, the second authentication symbol string storage unit 200 is implemented using the database 24 (or the auxiliary storage unit of the server device 22). A functional block other than the second authentication symbol string storage unit 200 is achieved by the control unit of the server device 22. That is, the control unit of the server device 22 executes processing according to a program, thereby functioning as a functional block other than the second authentication symbol string storage unit 200.

Initially, the first authentication symbol string storage unit 100 will be described. The first authentication symbol string storage unit 100 stores an authentication symbol string. For example, data such as is shown in FIG. 5 is stored in the first authentication symbol string storage unit 100.

Below, the authentication symbol string generation unit 102 will be described. According to a generation rule for generating a new authentication symbol string based on at least a part of an authentication symbol string, the authentication symbol string generation unit 102 generates a new authentication symbol string based on at least a part of the authentication symbol string stored in the first authentication symbol string storage unit 100.

For example, the authentication symbol string generation unit 102 includes an extraction unit 104. According to a generation rule, the extraction unit 104 extracts one or more symbols from the authentication symbol string stored in the first authentication symbol string storage unit 100. Then, according to the generation rule, the authentication symbol string generation unit 102 generates a new authentication symbol string based on the one or more symbols extracted by the extraction unit 104.

The generation rule in this case includes a rule in which a symbol at which position in an authentication symbol string is to be extracted, and a rule on how to generate a new authentication symbol string based on one or more symbols extracted from the authentication symbol string (see the examples (1) to (7) in FIG. 9 to be described later).

Further, for example, the authentication symbol string generation unit 102 includes a conversion unit 106. According to a generation rule, the conversion unit 106 converts at least a part of the authentication symbol string stored in the first authentication symbol string storage unit 100, to thereby obtain one or more symbols. Then, according to the generation rule, the authentication symbol string generation unit 102 generates a new authentication symbol string based on the one more symbols obtained by the conversion unit 106.

The generation rule in this case includes a rule on how to convert at least a part of an authentication symbol string, and a rule on how to generate a new authentication symbol based on the one or more symbols obtained by converting at least a part of the authentication symbol string (see the examples (4) to (7) in FIG. 9 to be described later).

Note that a "rule on how to convert at least a part of an authentication symbol string" includes at least one of the rules described below:

rule on conversion of one symbol in an authentication symbol string into one symbol (see the example (4) to be described later);

rule on conversion of one symbol in an authentication symbol string into a plurality of symbols (see the example (5) to be described later);

rule on conversion of a plurality of symbols in an authentication symbol string into one symbol (see the example (6) to be described later); and rule on conversion of a plurality of symbols in an authentication symbol string into a plurality of symbols (see the example (7) to be described later).

For example, according to the generation rule, the authentication symbol string generation unit 102 generates a symbol string including one or more symbols based on at least a part of the authentication symbol string stored in the first authentication symbol string storage unit 100, as a new authentication symbol string. The generation rule in this case includes a rule in which one or more symbols based on at least a part of an authentication symbol string is/are to be included into which position in a new authentication symbol string (see the examples (1) to (7) in FIG. 9 to be described later).

FIG. 9 explains a specific example of the generation rule. However, the generation rule is not limited to the examples (1) to (7) shown in FIG. 9.

Initially, the example (1) will be described. The generation rule in the example (1) is a generation rule to read that a symbol at a predetermined position (hereinafter referred to as an "extraction position") in an authentication symbol string is extracted, and that a symbol string including the extracted symbol inserted in a predetermined position (hereinafter referred to as an "insertion position") thereof is obtained as a new authentication symbol string.

In the example (1), the end position is set as the "extraction position", and the head position is set as the "insertion position". Note that a position other than the end position may be set as the "extraction position". For example, the head position may be set as the "extraction position". Further, for example, the $i^{th}$ position from the end (i: two or larger integer) may be set as the "extraction position". Similarly, a position other than the head position may be set as the "insertion position". For example, the end position may be set as the "insertion position". The $i^{th}$ position from the head (i: two or larger integer) may be set as the "extraction position". The "extraction position" and the "insertion position" may be different positions from each other or the same position.

In a case where the generation rule is one in the example (1) and the authentication symbol string stored in the first authentication symbol string storage unit 100 is "ABCDE", the authentication symbol string generation unit 102 (the extraction unit 104) extracts the symbol (E) at the extraction position (the end position) in the authentication symbol string stored in the first authentication symbol string storage unit 100, and obtains an authentication symbol string (for example, "EXPT4H368B") including the extracted symbol (E) inserted in the insertion position (the head position) thereof as a new authentication symbol string.

In this case, "XPT4H368B", namely, the part of the new authentication symbol string "EXPT4H368B" other than the head character "E", is generated at random. That is, the length of the part other than the head character "E" and the symbols constituting the part other than the character "E" are determined at random.

Below, the examples (2) and (3) will be described. The generation rule in the examples (2) and (3) is a generation rule to read that a plurality of symbols at predetermined extraction positions in an authentication symbol string are extracted, and that a symbol string including the plurality of extracted symbols inserted in predetermined insertion positions thereof is obtained as a new authentication symbol string.

In the example (2), the second position from the end and the end position are set as "extraction positions". In the example (3), a plurality of discrete positions are set as "extraction positions". That is, the third position from the end and the end position are set as "extraction positions". Note that any other position may be set as the "extraction position". Further, in the examples (2) and (3), the head position and the second position from the head are set as the "insertion positions". Note that any other position may be set as the "insertion position". A plurality of discrete positions may be set as the "insertion positions".

In a case where the generation rule is one in the example (2) and the authentication symbol string stored in the first authentication symbol string storage unit 100 is "ABCDE", the authentication symbol string generation unit 102 (the extraction unit 104) extracts the symbols (DE) at the extraction positions (the second position from the end and the end position) in the authentication symbol string stored in the first authentication symbol string storage unit 100, and obtains an authentication symbol string (for example, "DEXPT4H368B") including the extracted symbols (DE) inserted in the insertion positions (the head position and the second position from the head) thereof as a new authentication symbol string. Note that in this case as well, the part "XPT4H368B" is generated at random.

In a case where the generation rule is one in the example (3), and the authentication symbol string stored in the first authentication symbol string storage unit 100 is "ABCDE", the authentication symbol string generation unit 102 (the extraction unit 104) extracts symbols (CE) at the extraction positions (the third position from the end and the end position) in the authentication symbol string stored in the first authentication symbol string storage unit 100, and obtains an authentication symbol string (for example, "CEXPT4H368B") including the extracted symbols (CE) inserted in the insertion positions (the head position and the second position from the head) thereof as a new authentication symbol string. Note that in this case as well, the part "XPT4H368B" is generated at random.

Below, the example (4) will be described. The generation rule in the example (4) is a generation rule to read that a symbol at a predetermined extraction position in an authentication symbol string is extracted, and that a symbol string including a symbol, which is obtained by converting the extracted symbol and is inserted in a predetermined insertion position thereof, is obtained as a new authentication symbol string. In the example (4), similar to the example (1), the end position is set as the "extraction position", and the head position is set as the "insertion position". Similar to the example (1), any position other than the end position may be set as the "extraction position", and any position other than the head position may be set as the "insertion position".

In a case where the generation rule is one in the example (4), and the authentication symbol string stored in the first authentication symbol string storage unit 100 is "ABCDE", the authentication symbol string generation unit 102 (the extraction unit 104) extracts the symbol (E) at the extraction position (the end position) in the authentication symbol string stored in the first authentication symbol string storage unit 100.

Then, the authentication symbol string generation unit 102 (the conversion unit 106) converts the extracted symbol (E) into another symbol according to a predetermined conversion rule. For example, the authentication symbol string generation unit 102 (the conversion unit 106) converts the extracted symbol into another symbol according to an order predetermined with respect to the symbols. For example, the authentication symbol string generation unit 102 (the conversion unit 106) converts the extracted symbol into a symbol immediately after that symbol. Specifically, in the example (4), the extracted alphabet "E" is converted into an alphabet immediately after the alphabet "E", namely, the alphabet "F". Note that a conversion table for correlating an original symbol in conversion and a converted symbol may be stored in advance in the auxiliary storage unit, so that the conversion is executed based on the conversion table.

The authentication symbol string generation unit 102 obtains a symbol string (for example, "FXPT4H368B") including the symbol obtained through conversion inserted in the insertion position (the head position) thereof as a new symbol string. Note that the part "XPT4H368B" is generated at random in this case as well.

Below, the example (5) will be described. The generation rule in the example (5) is a generation rule to read that one symbol at a predetermined extraction position in an authentication symbol string is extracted, and that a symbol string including a plurality of symbols, which are obtained by converting the one extracted symbol and are inserted in an insertion position thereof, is obtained as a new authentication symbol string.

In the example (5), similar to the example (1), the end position is set as the "extraction position". Further, similar to the examples (2) and (3), the head position and the second position from the head are set as the "insertion positions". Similar to the examples (1) to (3), any other position may be set as the "extraction position" or the "insertion position".

In a case where the generation rule is one in the example (5) and the authentication symbol string stored in the first authentication symbol string storage unit 100 is "ABCDE", the authentication symbol string generation unit 102 (the extraction unit 104) extracts the symbol (E) at the extraction position (the end position) in the authentication symbol string stored in the first authentication symbol string storage unit 100.

Then, the authentication symbol string generation unit 102 (the conversion unit 106) converts the one extracted symbol (E) into a plurality of symbols according to a predetermined conversion rule. For example, the authentication symbol string generation unit 102 (the conversion unit 106) converts the one extracted symbol into a plurality of symbols according to an order predetermined with respect to the symbols. For example, the authentication symbol string generation unit 102 (the conversion unit 106) converts the extracted symbol into two symbols immediately after the extracted symbol. Specifically, in the example (5), the alphabet "E" is converted into two alphabets, namely, the alphabets "FG", immediately after that alphabet "E". Note that a conversion table for correlating an original symbol in conversion and converted symbols may be stored in advance in the auxiliary storage unit, so that the conversion is executed based on the conversion table.

Then, the authentication symbol string generation unit 102 obtains a symbol string (for example "FGXPT4H368B") including the plurality of symbols, which are obtained through conversion and are inserted in the insertion position (the head position and the second position from the head) thereof, as a new symbol string. Note that the part "XPT4H368B" is generated at random in this case as well.

Below, the example (6) will be described. The generation rule in the example (6) is a generation rule to read that a plurality of symbols at predetermined extraction positions in an authentication symbol string are extracted, and that a symbol string including one symbol, which is obtained by converting the plurality of extracted symbols and is inserted in a predetermined insertion position thereof, is obtained as a new authentication symbol string.

In the example (6), similar to the example (2), the second position from the end and the end position are set as the "extraction positions". Similar to the example (1), the head position is set as the "insertion position". Note that similar to the examples (1) and (2), any other position may be set as the "extraction position" or the "insertion position".

In a case where the generation rule is one in the example (6), and the authentication symbol string stored in the first authentication symbol string storage unit 100 is "ABCDE", the authentication symbol string generation unit 102 (the extraction unit 104) extracts a plurality of symbols (DE) at the extraction positions (the second position from the end and the end position) in the authentication symbol string stored in the first authentication symbol string storage unit 100.

Then, the authentication symbol string generation unit 102 (the conversion unit 106) converts the plurality of extracted symbols (DE) into a single symbol according to a predetermined conversion rule. For example, in this case, a conversion table for correlating a plurality of original symbols in conversion and one converted symbol is stored in advance in the auxiliary storage unit, so that the authentication symbol string generation unit 102 (the conversion unit 106) executes the conversion based on the conversion table. In the example (6), the plurality of extracted characters "DE" are converted into the character "K".

Then, the authentication symbol string generation unit 102 obtains a symbol string (for example "KXPT4H368B") including the single symbol, which is obtained through conversion and is inserted in the insertion position (the head position) thereof, as a new symbol string. Note that the part "XPT4H368B" is generated at random in this case as well.

Below, the example (7) will be described. The generation rule in the example (7) is a generation rule to read that a plurality of symbols at predetermined extraction positions in an authentication symbol string are extracted, and that a symbol string including a plurality of symbols, which are obtained by converting the plurality of extracted symbols and are inserted in predetermined insertion positions thereof, is obtained as a new authentication symbol string.

In the example (7), similar to the example (2), the second position from the end and the end position are set as "extraction positions". Moreover, the head position, the second position from the head and the third position from the head are set as the "insertion positions". Note that any other position may be set as the "extraction position" or the "insertion position".

In a case where the generation rule is one in the example (7) and the authentication symbol string stored in the first authentication symbol string storage unit 100 is "ABCDE", the authentication symbol string generation unit 102 (the extraction unit 104) extracts a plurality of symbols (DE) at the extraction positions (the second position from the end and the end position) in the authentication symbol string stored in the first authentication symbol string storage unit 100.

Then, the authentication symbol string generation unit 102 (the conversion unit 106) converts the plurality of extracted symbols (DE) into a plurality of symbols according to a predetermined conversion rule. In this case, them (m: two or larger integer) number of extracted symbols are converted into the n (n: two or larger integer) number of symbols. Note that "m" and "n" may be the same or different numeric value.

For example, in this case, a conversion table for correlating a plurality of original symbols in conversion and a plurality of converted symbols may be stored in advance in the auxiliary storage unit, so that the authentication symbol string generation unit 102 (the conversion unit 106) executes the conversion based on the conversion table. In the example (7), the plurality of extracted characters "DE" are converted into a plurality of characters "MLS".

Then, the authentication symbol string generation unit 102 (the conversion unit 106) obtains a symbol string (for example, "MLSXPT4H368B") including the plurality of converted symbols inserted in the insertion position (the head position) thereof as a new symbol string. Note that the part "XPT4H368B" is generated at random in this case as well.

Below, the authentication information transmission unit 108 and the authentication information receiving unit 202 will be described. The authentication information transmission unit 108 sends the terminal ID (terminal identification information) of the terminal device 10 and an authentication symbol string (a new authentication symbol string) generated by the authentication symbol string generation unit 102 to the server device 22. Thereafter, the authentication information receiving unit 202 receives the terminal ID and the authentication symbol string (a new authentication symbol string) both sent from the authentication information transmission unit 108.

Below, the second authentication symbol string storage unit 200 will be described. The second authentication symbol string storage unit 200 stores an authentication symbol string so as to be correlated to a terminal ID. For example, a terminal table such as is shown in FIG. 6 is stored in the second authentication symbol string storage unit 200. Note that, on principle, in the second authentication symbol string storage unit 200 (terminal table), an authentication symbol string same as the authentication symbol string stored in the auxiliary storage unit of the terminal device 10 is stored so as to be correlated to the terminal ID of the terminal device 10. That is, for example, an authentication symbol string (ABCDE) stored in the auxiliary storage unit of the terminal device 10 having the terminal ID "T00001" is stored in the second authentication symbol string storage unit 200 (terminal table) so as to be correlated to the terminal ID "T00001".

Below, the determination unit 204 will be described. The determination unit 204 determines whether or not the terminal ID and authentication symbol string received by the authentication information receiving unit 202 are authentic.

Specifically, the determination unit 204 determines whether or not the authentication symbol string received by the authentication information receiving unit 202 belongs to a type of "an authentication symbol string that can be generated based on at least a part of the authentication symbol string stored in the second authentication symbol string storage unit 200 so as to be correlated to the terminal ID received by the authentication information receiving unit 202, according to the generation rule same as that which is used in the authentication symbol string generation unit 102".

In order to determine whether or not the authentication symbol string received by the authentication information receiving unit 202 belongs to the above mentioned type, the determination unit 204 determines whether or not the authentication symbol string received by the authentication information receiving unit 202 has a characteristic feature which an authentication symbol string belonging to the above mentioned type should have. In other words, the determination unit 204 determines whether or not the authentication symbol string received by the authentication information receiving unit 202 satisfies a condition which an authentication symbol string belonging to the above mentioned type should satisfy.

For example, in a case where the generation rule is one in the example (1) in FIG. 9, a characteristic feature which an authentication symbol string belonging to the above mentioned type should have is that "the symbol (character) at the head is the same as the symbol (character) at the end of the authentication symbol string stored in the second authentication symbol string storage unit 200". Therefore, the above mentioned "condition" is to read that "the symbol (character) at the head of the authentication symbol string received by the authentication information receiving unit 202 is the same as the symbol (character) at the end of the authentication symbol string stored in the second authentication symbol string storage unit 200".

For example, in a case where the generation rule is one in the example (4) in FIG. 9, a characteristic feature which an authentication symbol string belonging to the above mentioned type should have is that "the symbol (character) at the head is a symbol (character) obtained by converting the symbol (character) at the end of the authentication symbol string stored in the second authentication symbol string storage unit 200 according to a predetermined conversion rule". Therefore, the above mentioned "condition" is to read that "the symbol (character) at the head of the authentication symbol string received by the authentication information receiving unit 202 is a symbol (character) obtained by converting the symbol (character) at the end of the authentication symbol string stored in the second authentication symbol string storage unit 200 according to a predetermined conversion rule".

Upon determination that the authentication symbol string received by the authentication information receiving unit 202 belongs to the above mentioned type, the determination unit 204 determines that the terminal ID and authentication symbol string received by the authentication information receiving unit 202 are authentic.

Blow, the notice information transmission unit 206 and the notice information receiving unit 110 will be described. Upon determination that the terminal ID and authentication symbol string received by the authentication information receiving unit 202 are authentic, the notice information transmission unit 206 sends notice information to the terminal device 10 to notify that the terminal ID and authentication symbol string received by the authentication information receiving unit 202 are authentic and/or that use of content or an application in the terminal device 10 is permitted. Thereafter, the notice information receiving unit 110 receives the notice information sent from the notice information transmission unit 206.

Below, the permitting unit 112 will be described. The permitting unit 112 permits use of content or an application, based on the notice information received by the notice information receiving unit 110. In the terminal device 10, upon determination that the terminal ID and authentication symbol string received by the authentication information receiving unit 202 are authentic, it is permitted to output content, such as music, image, video, electronic book, or the like, and to execute content, such as a game or the like, or an application.

Below, the first authentication symbol string updating unit 114 and the second authentication symbol string updating unit 208 will be described.

When the determination unit 204 determines that the terminal ID and authentication symbol string received by the authentication information receiving unit 202 are authentic, the second authentication symbol string updating unit 208 updates the authentication symbol string stored in the second authentication symbol string storage unit 200 so as to be correlated to the terminal ID received by the authentication information receiving unit 202 to the authentication symbol string received by the authentication information receiving unit 202.

Further, when the determination unit 204 determines that the terminal ID and authentication symbol string received by the authentication information receiving unit 202 are authentic, the first authentication symbol string updating unit 114 updates the authentication symbol string stored in the first authentication symbol string storage unit 100 to the authentication symbol string sent by the authentication information transmission unit 108.

With the above described operation of the first authentication symbol string updating unit 114 and the second authentication symbol string updating unit 208, the authentication symbol string stored in the first authentication symbol string storage unit 100 of the terminal device 10 and the authentication symbol string stored in the second authentication symbol string storage unit 200 so as to be correlated to the terminal ID of the terminal device 10 are updated to the same authentication symbol string, when the determination unit 204 determines that the terminal ID and authentication symbol string received by the authentication information receiving unit 202 are authentic.

Figure 10:
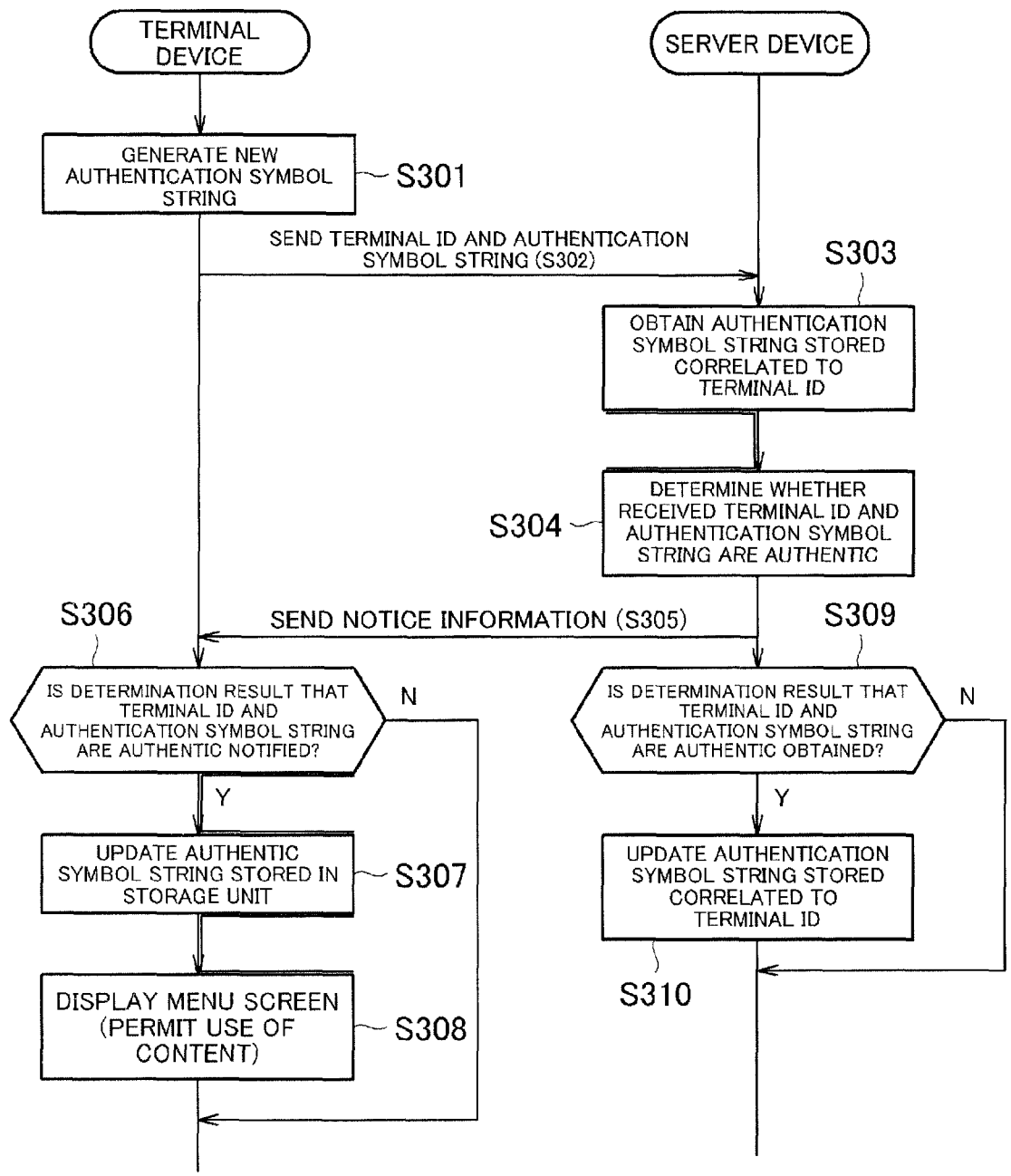
FIG. 10 shows one example of processing executed in the content or application providing system.

Below, processing executed in implementing the above described functional blocks will be described. FIG. 10 shows processing executed at second and thereafter accesses from the terminal device 10 to the server device 22. The control unit of the terminal device 10 executes the processing shown in FIG. 10 according to the program, thereby functioning as the authentication symbol string generation unit 102, the authentication information transmission unit 108, the notice information receiving unit 110, the permitting unit 112, and the first authentication symbol string updating unit 114. Meanwhile, the control unit of the server device 22 executes the processing shown in FIG. 10 according to the program, thereby functioning as the authentication information receiving unit 202, the determination unit 204, the notice information transmission unit 206, and the second authentication symbol string updating unit 208.

As shown in FIG. 10, initially, according to a predetermined generation rule, the control unit (the authentication symbol string generation unit 102) of the terminal device 10 generates a new authentication symbol string, based on the authentication symbol string stored in the auxiliary storage unit (the first authentication symbol string storage unit 100) of the terminal device 10 (S301). Specifically, a new authentication symbol string is generated according to, for example, a generation rule such as is described referring to FIG. 9. Thereafter, the control unit (the authentication information transmission unit 108) of the terminal device 10 sends the terminal ID and the new authentication symbol string generated at step S301 to the server device 22 (S302).

Upon receipt of the terminal ID and the authentication symbol string by the server device 22, the control unit of the server device 22 accesses the terminal table (the second authentication symbol string storage unit 200), and obtains the authentication symbol string stored so as to be correlated to the received terminal ID (S303).

Then, the control unit (the determination unit 204) of the server device 22 determines whether or not the combination of the received terminal ID and authentication symbol string is authentic (S304). Specifically, the control unit determines whether or not the received authentication symbol string corresponds to "an authentication symbol string that can be generated based on at least a part of the authentication symbol string obtained at step S303, according to a generation rule". Note that the "generation rule" at step S304 is the generation rule same as that which is used in generation of a new authentication symbol string at step S301.

For example, in the auxiliary storage unit of the server device 22, a condition in which "an authentication symbol string that can be generated based on at least apart of the authentication symbol string obtained at step S303, according to the generation rule" should satisfy is stored in advance. As described above, for example, in a case where the generation rule is one in the example (1) in FIG. 9, the stored condition should be read as that "the symbol (character) at the head of the authentication symbol string received by the authentication information receiving unit 202 is the same as the symbol (character) at the end of the authentication symbol string stored in the second authentication symbol string storage unit 200". Then, at step S304, the control unit of the server device 22 determines whether or not the received authentication symbol string satisfies the condition. When the received authentication symbol string satisfies the condition, it is determined that the received authentication symbol string corresponds to "an authentication symbol string that can be generated based on at least a part of the authentication symbol string obtained at step S303, according to the generation rule".

After the processing at step S304 executed, the control unit (the notice information transmission unit 206) of the server device 22 sends information to the terminal device 10 to notify the terminal device 10 of the result of the determination at step S304 (S305).

Note that upon determination at step S304 that the combination of the terminal ID and the authentication symbol string is authentic, the control unit further sends information to the terminal device 10 to notify of a list of content (for example, an electronic book) usable in the terminal device 10. That is, the control unit reads from the terminal table, a list of content IDs stored so as to be correlated to the terminal ID received from the terminal device 10, and sends the list to the terminal device 10.

Upon receipt of the notice information by the terminal device 10, the control unit of the terminal device 10 determines whether or not a result of determination to the effect that the terminal ID and authentication symbol string are authentic is notified from the server device 22 (S306).

Upon notice from the server device 22, of a result of determination to the effect that the terminal ID and the authentication symbol string are authentic, the control unit of the terminal device 10 (the first authentication symbol string updating unit 114) updates the authentication symbol string stored in the auxiliary storage unit (the first authentication symbol string storage unit 100) of the terminal device 10 to the authentication symbol string sent to the server device 22 at step S302 (that is, the authentication symbol string generated at step S301) (S307).

Further, the control unit (the permitting unit 112) of the terminal device 10 displays a menu screen (FIG. 7) on the display unit (S308), and permits use of content (an electronic book) stored in the terminal device 10. That is, use of content is permitted, based on the list of content usable in the terminal device 10, notified by the server device 22. That is, a user can reproduce and/or execute the content.

On the other hand, in the server device 22, after the processing at step S305 executed, it is determined whether or not a result of determination to the effect that the terminal ID and the authentication symbol string are authentic is obtained at step S304 (S309). In a case where a result of determination to the effect that the terminal ID and the authentication symbol string are authentic is obtained at step S304, the control unit (the second authentication symbol string updating unit 208) of the server device 22 accesses the terminal table (the second authentication symbol string storage unit 200), and updates the authentication symbol string stored so as to be correlated to the terminal ID received at step S302 to the authentication symbol string received at step S302 (S310). Description on the processing shown in FIG. 10 is completed with the above.

According to the above described content or application providing system 1 according to the first embodiment, it is possible to restrict a terminal device in which content or an application can be used to a single terminal device among a single authorized terminal device and one or more unauthorized terminal devices.

Below, assume a situation in which content or an application stored in the terminal device 10 (an authorized terminal device) authentically allowed to use the content or application is copied to one or more other terminal devices 10 (one or more unauthorized terminal devices), and the terminal ID and the authentication symbol string stored in the authorized terminal device are registered (impersonation) in these unauthorized terminal devices as a terminal ID and an authentication symbol string thereof. That is, assume a situation in which the terminal ID, the authentication symbol string, and the content stored in the authorized terminal device are stored also in a plurality of terminal devices 10 (the authorized terminal device and one or more unauthorized terminal devices).

When any terminal device 10 (that is, any of the authorized terminal device and the one or more unauthorized terminal devices) accesses the server device 22 in the above described situation, the terminal ID and authentication symbol string of the authorized terminal device are sent to the server device 22, and therefore content can be used in the terminal device 10.

In the above, the authentication symbol string stored in the terminal device 10 and the authentication symbol string stored in the server device 22 so as to be correlated to the terminal ID of the authorized terminal device are updated. Thus, even though another terminal device 10 thereafter accesses the server device 22, it is determined that the combination of the terminal ID and the authentication symbol string is not authentic, and therefore the content cannot be used in that terminal device 10.

As describe above, according to the content or application providing system 1, even though an terminal ID, an authentication symbol string, and content or an application stored in one authorized terminal device are stored in a plurality of terminal devices 10 as well (the one authorized terminal device and one or more unauthorized terminal devices), it is possible to restrict a terminal device in which content or an application can be used to one terminal device among these plurality of terminal devices 10.

Note here that there may be caused a case, due to deficiency or the like caused to the communication network 2, in which the authentication symbol string stored in the terminal device 10 (the first authentication symbol string storage unit 100) does not coincide with that stored in the server device 22 (the second authentication symbol string storage unit 200). For example, if any deficiency should be caused to the communication network 2 in exchanging notice information at step S305 in FIG. 10, a situation may be resulted in which only the authentication symbol string stored in the server device 22 is updated while that stored in the terminal device 10 remains not updated.

In such a case, as the authentication symbol string stored in the terminal device 10 does not coincide with that stored in the server device 22, it will be determined at step S304 in FIG. 10 at the next access from the terminal device 10 to the server device 22 that the combination of the terminal ID and the authentication symbol string is not authentic. As a result, it will be determined at step S306 that a result of determination to the effect that the terminal ID and the authentication symbol string are authentic is not notified by the server device 22, and therefore a user will not be allowed to use content or an application.

Figure 11:
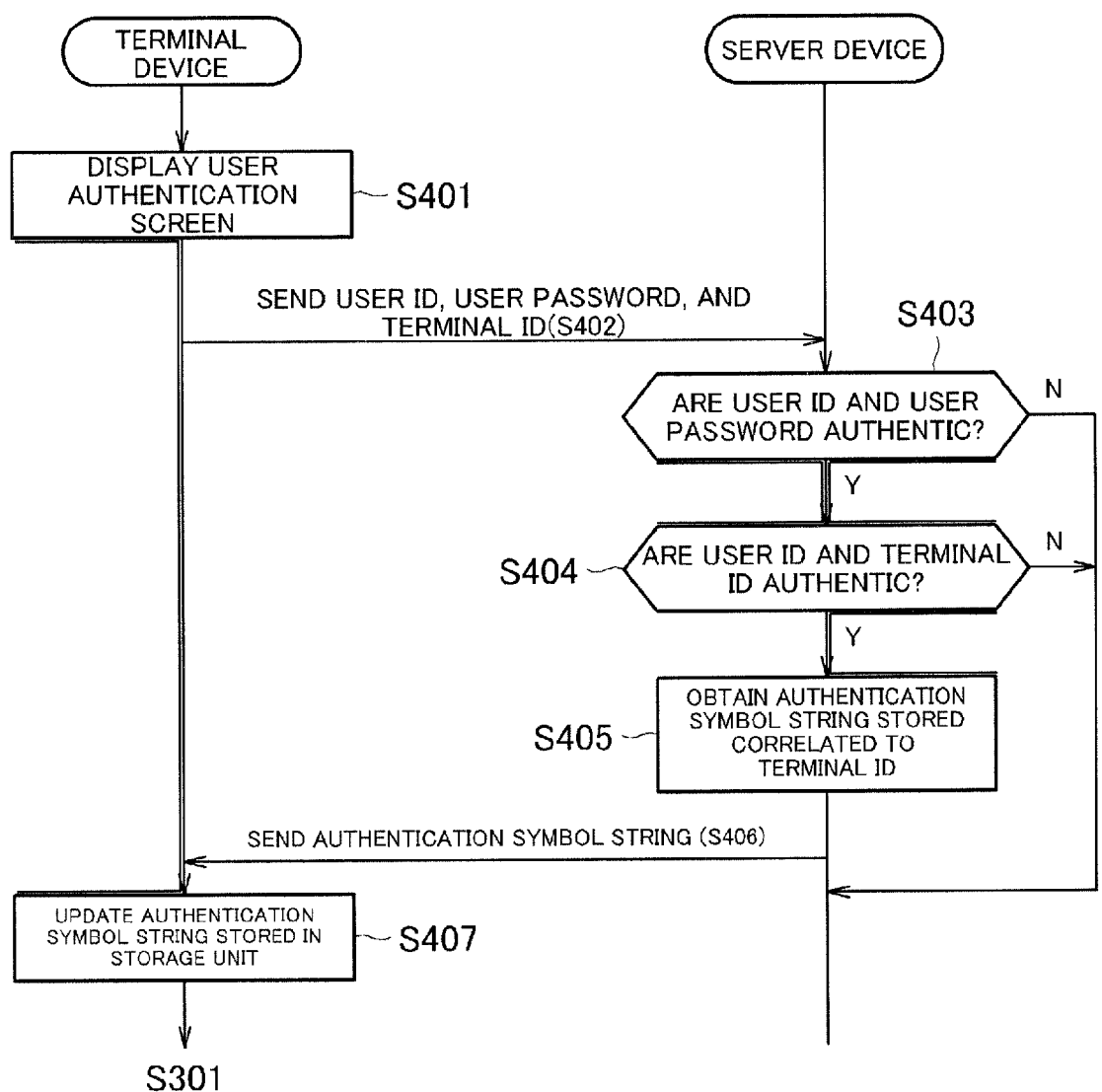
FIG. 11 shows one example of processing executed in the content or application providing system.

Regarding this point, according to the content or application providing system 1, in a case where it is determined at S306 in FIG. 10 that a result of determination to the effect that the terminal ID and the authentication symbol string are authentic is not notified by the server device 22, the processing shown in FIG. 11 is executed. As a result, it is possible to ensure that an authentic user can use content or an application.

When it is determined at step S306 in FIG. 10 that a result of determination to the effect that the terminal ID and the authentication symbol string are authentic is not notified by the server device 22, the control unit of the terminal device 10 displays a user authentication screen on the display unit (S401), as shown in FIG. 11. The user authentication screen is the same as that displayed at step S201 in FIG. 4.

The control unit of the terminal device 10 sends the user ID and user password both input in the user authentication screen and the terminal ID stored in the auxiliary storage unit to the server device 22 (S402). Upon receipt of the user ID, the user password, and the terminal ID by the server device 22, the control unit of the server device 22 determines whether or not the combination of the received user ID and user password is authentic (S403). The processing at step S403 is the same as that at step S203 in FIG. 4.

Upon determination that the combination of the user ID and the user password is authentic, the control unit of the server device 22 determines whether or not the combination of the user ID and terminal ID both received at step S402 is authentic (S404). That is, the control unit determines whether or not the combination of the user ID and terminal ID both received at S402 is registered in the terminal table.

Upon determination that the combination of the user ID and the terminal ID is authentic, the control unit of the server device 22 accesses the terminal table, and obtains the authentication symbol string stored so as to be correlated to the terminal ID received at step S402 (S405). Then, the control unit sends the authentication symbol string to the terminal device 10 (S406). Note that in a case where it is not determined at step S403 that the combination of the user ID and the user password is authentic, and at step S404 that the combination of the user ID and the terminal ID is authentic, the processing at steps S405 and s406 is not executed.

Upon receipt of the authentication symbol string sent from the server device 22 by the terminal device 10, the control unit of the terminal device 10 updates the authentication symbol string stored in the auxiliary storage unit to the received authentication symbol string (S407). Then, the control unit executes the processing at step S301 in FIG. 10. In this case, as the authentication symbol string stored in the terminal device 10 and that stored in the server device 22 coincide with each other, a user can use content (an electronic book).

According to the above described processing shown in FIG. 11, even when a situation is resulted, due to deficiency or the like caused to the communication network 2, in which the authentication symbol string stored in the terminal device 10 does not coincide with that stored in the server device 22, an authentic user can initialize the authentication symbol string stored in the terminal device 10 and that in the server device 22 to the same authentication symbol string. As a result, it is possible to ensure that an authentic user can use content or an application.

Figure 12:
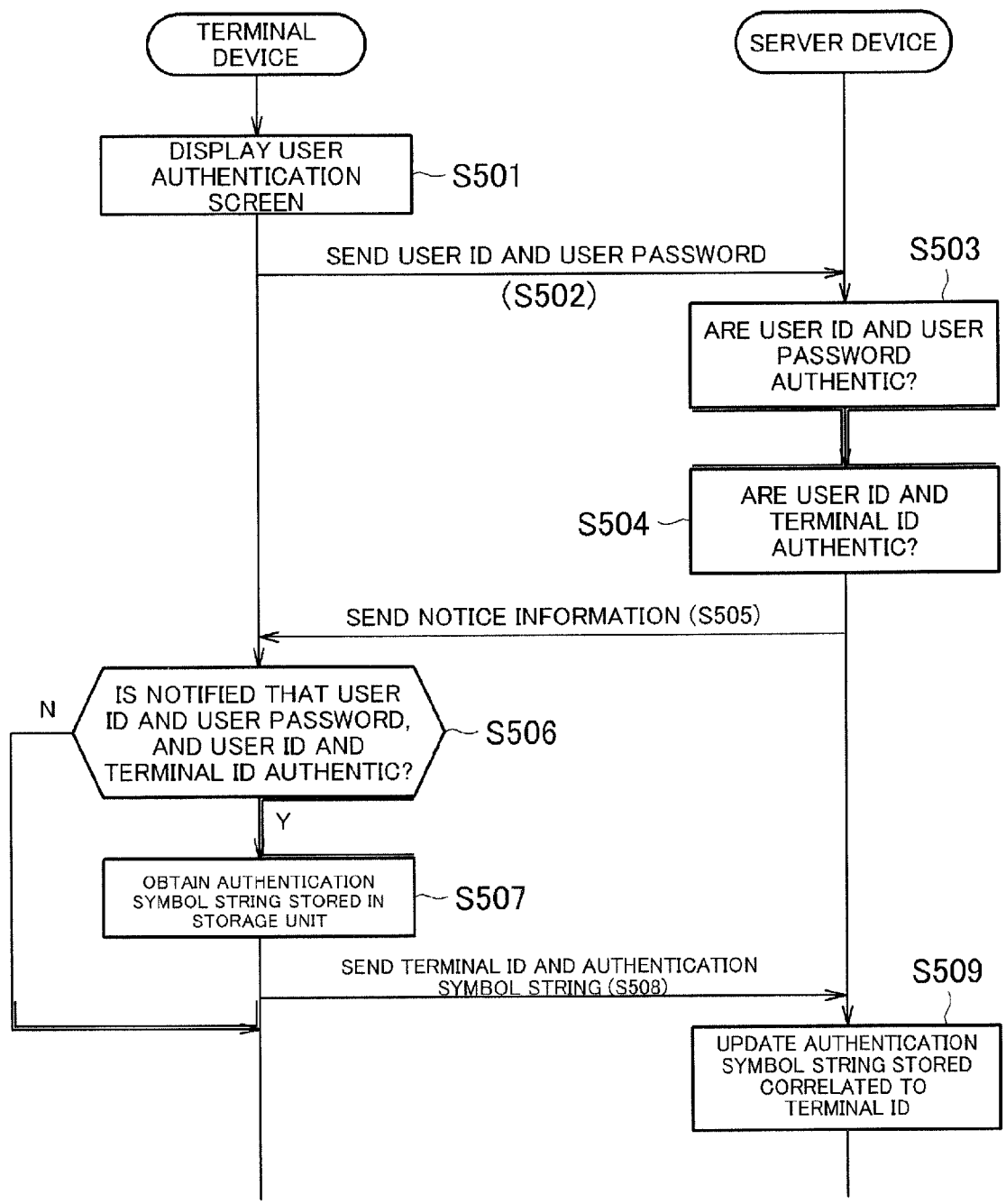
FIG. 12 shows one example of processing executed in the content or application providing system.

Note that, in the processing shown in FIG. 11, the authentication symbol string stored in the terminal device 10 is updated to the authentication symbol string stored in the server device 22, to thereby initialize the situation so that the authentication symbol string stored in the terminal device 10 and that stored in the server device 22 coincide with each other. However, the authentication symbol string stored in the server device 22 may be updated to that stored in the terminal device 10, to thereby initialize the situation so that the authentication symbol string stored in the terminal device 10 and that stored in the server device 22 coincide with each other. FIG. 12 shows one example of processing in that case.

The processing at S501 and S502 in FIG. 12 is similar to the processing at S401 and S402 in FIG. 11. Upon receipt of the user ID, user password, and terminal ID sent from the terminal device 10 by the server device 22, the control unit of the server device 22 determines whether or not the combination of the user ID and the user password sent from the terminal device 10 is authentic (S503). Further, the control unit of the server device 22 determines whether or not the combination of the user ID and the terminal ID sent from the terminal device 10 is authentic (S504). The processing at steps S503 and S504 is similar to the processing at steps S403 and S404 in FIG. 11.

The control unit of the server device 22 sends information to the terminal device 10 to notify the terminal device 10 of a result of the determination at steps S503 and S504 (S505). Upon receipt of the above-described notice information by the terminal device 10, the control unit of the terminal device 10 determines whether or not a result of determination to the effect that the combination of the user ID and the user password is authentic and that the combination of the user ID and the terminal ID is also authentic is notified (S506). When it is determined that a result of determination to the effect that the combination of the user ID and the user password is authentic and the combination of the user ID and the terminal ID is authentic as well is notified, the control unit of the terminal device 10 obtains the authentication symbol string stored in the auxiliary storage unit (S507), and sends the authentication symbol string to the server device 22 together with the terminal ID (S508).

Upon receipt of the terminal ID and the authentication symbol string by the server device 22, the control unit of the server device 22 accesses the terminal table, and updates the authentication symbol string stored so as to be correlated to the received terminal ID to the received authentication symbol string (S509).

With the processing shown in FIG. 12 as well, similar to the processing in FIG. 11, even though a situation is resulted, due to deficiency or the like caused to the communication network 2, in which the authentication symbol string stored in the terminal device 10 and that stored in the server device 22 do not coincide with each other, an authentic user can initialize the situation so that the authentication symbol string stored in the terminal device 10 and that stored in the server device 22 coincide with each other. As a result, it is possible to ensure that an authentic user can use content or an application.

Second Embodiment

A content or application providing system according to a second embodiment of the present invention will be described. An overall structure of the content or application providing system 1 according to the second embodiment is similar to that in the first embodiment. In the following, as to the content or application providing system 1 according to the second embodiment, a difference from the first embodiment will be described.

In the content or application providing system 1 according to the second embodiment, the generation rule for generating a new authentication symbol string is changed depending on an original authentication symbol string for generation. In the following, a structure for implementing such a function will be described.

Figure 13:
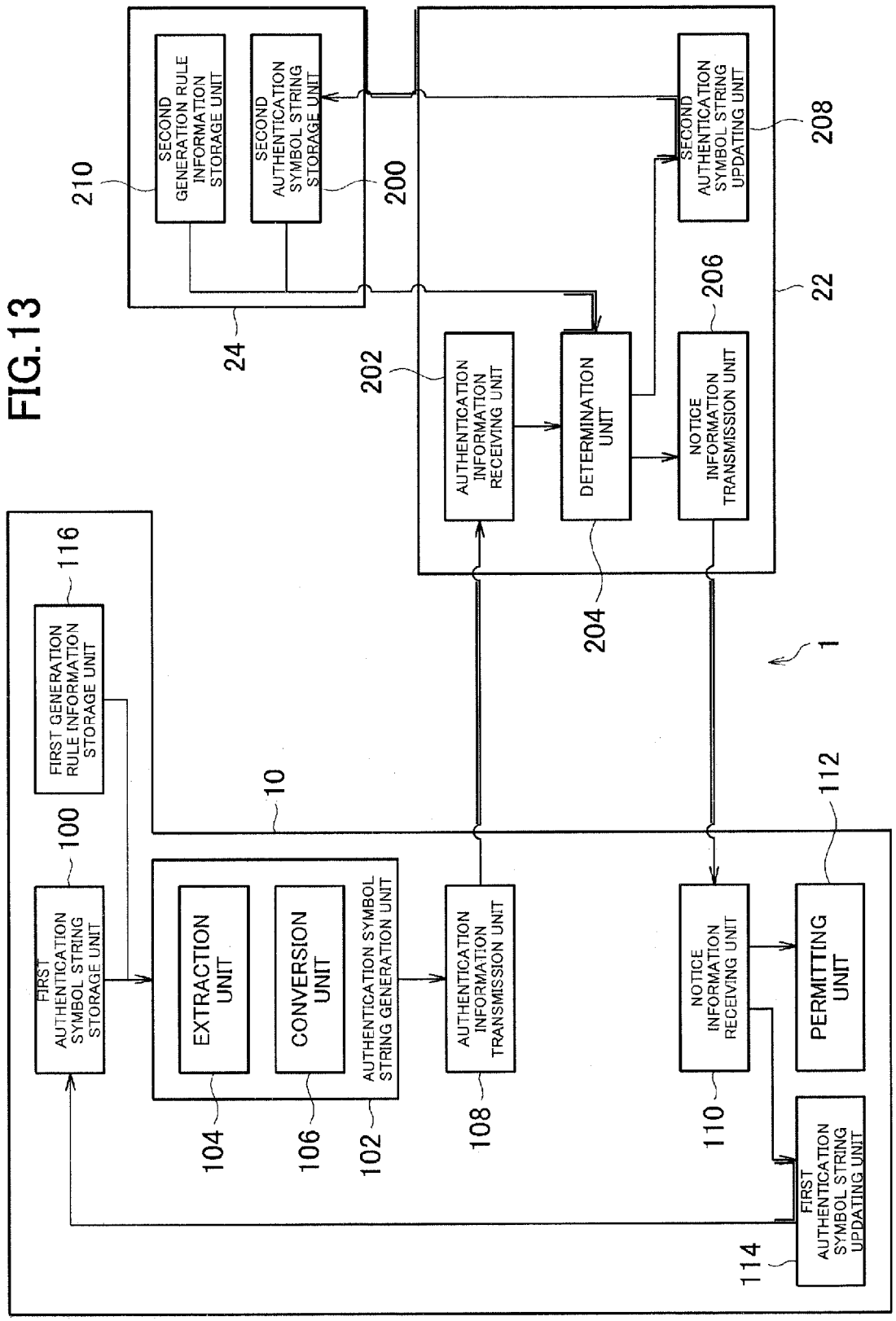
FIG. 13 is a functional block diagram of a content or application providing system according to a second embodiment.

FIG. 13 is a functional block diagram showing a functional block relevant to the present invention among those which are implemented in the content or application providing system 1 according to the second embodiment.

The content or application providing system 1 according to the second embodiment differs from the first embodiment in that the former includes a first generation rule information storage unit 116 and a second generation rule information storage unit 210. For example, the first generation rule information storage unit 116 is implemented using the auxiliary storage unit of the terminal device 10, and the second generation rule information storage unit 210 is implemented using the auxiliary storage unit of the server device 22 (or the database 24).

The first generation rule information storage unit 116 stores generation rule information. Generation rule information is information for correlating information on an authentication symbol string and a generation rule for generating a new authentication symbol string based on an authentication symbol string.

"Information on an authentication symbol string" refers to information concerning, for example, the length of an authentication symbol string. FIG. 14 shows one example of the generation rule information in a case where the "information on an authentication symbol string" is information on the length of an authentication symbol string. In the generation rule information shown in FIG. 14, a generation rule for an authentication symbol string is correlated to a range of the length of an authentication symbol string. In FIG. 14, "Xa" refers to a predetermined value indicating the length (the number of characters) of an authentication symbol string, and a "generation rule A" and a "generation rule B" are different generation rules.

For example, the generation rules A and B are each "a generation rule for extracting one or more symbols at one or more extraction positions in an authentication symbol string, and generating a symbol string including the extracted one or more symbols inserted in one or more insertion positions thereof as a new authentication symbol string" (see the examples (1) to (3) in FIG. 9). The generation rules A and B are different from each other in at least one of the above-mentioned "extraction position" and "insertion position".

Specifically, for example, the generation rule A is the generation rule in the example (1) in FIG. 9, for generating a new authentication symbol string by extracting a symbol at the end position in an authentication symbol string. Meanwhile, the generation rule B is a generation rule similar to that in the example (1) in FIG. 9 but different from the generation rule A in that a symbol at the head position in an authentication symbol string is extracted.

Alternatively, for example, the generation rule A is the generation rule in the example (1) in FIG. 9, for generating a symbol string including an extracted symbol inserted in the head position thereof as a new authentication symbol string. Meanwhile, the generation rule B is a generation rule similar to that in the example (1) in FIG. 9 but different from the generation rule A in that a symbol string including an extracted symbol inserted in the end position thereof is generated as a new authentication symbol string.

Further, for example, the generation rules A and B are each "a generation rule for extracting one or more symbols at one or more extraction positions in an authentication symbol string, and generating a symbol string including one or more symbols, which are obtained by converting the one or more extracted symbols according to a conversion rule and are inserted in one or more insertion positions thereof, as a new authentication symbol string" (see the examples (4) to (7) in FIG. 9). The generation rules A and B are different from each other in the "conversion rule".

Specifically, for example, the generation rule A is the generation rule in the example (4) in FIG. 9, while the generation rule B is the generation rule in the example (5) in FIG. 9. Alternatively, the generation rule A is the generation rule in the example (6) in FIG. 9, while the generation rule B is the generation rule in the example (7) in FIG. 9.

Note that the generation rules A, B are not limited to the above-described examples. For example, the generation rule A may be the generation rule in the example (1) in FIG. 9, while the generation rule B may be the generation rule in the example (2) in FIG. 9.

Further, "information on an authentication symbol string" refers to information concerning, for example, the type of a symbol at a predetermined position in an authentication symbol string. Note here that a "predetermined position" is, for example, the "head position" or the "end position". The "predetermined position" may be a position other than the "head position" and the "end position". FIG. 15 shows one example of the generation rule information in a case where the "information on an authentication symbol string" is information on the type of a symbol at a predetermined position in an authentication symbol string. In the generation rule information shown in FIG. 15, the type of a symbol is correlated to a generation rule of an authentication symbol string. In FIG. 15, the "symbol group A" is a group to which certain symbols belong, while the "symbol group B" is a group to which other symbols belong. The "generation rule A" and the "generation rule B" are similar to those in FIG. 14.

The second generation rule information storage unit 210 stores the generation rule information stored in the first generation rule information storage unit 116.

The authentication symbol string generation unit 102 specifies a generation rule corresponding to the authentication symbol string stored in the first authentication symbol string storage unit 100, based on the generation rule information stored in the first generation rule information storage unit 116. Then, according to that generation rule, the authentication symbol string generation unit 102 generates a new authentication symbol string based on at least a part of the authentication symbol string stored in the first authentication symbol string storage unit 100.

For example, if generation rule information such as is shown in FIG. 14 is stored in the first generation rule information storage unit 116, the authentication symbol string generation unit 102 uses a generation rule correlated to the length of the authentication symbol string stored in the first authentication symbol string storage unit 100. For example, when the length (x) of the authentication symbol string stored in the first authentication symbol string storage unit 100 satisfies "x<Xa", the authentication symbol string generation unit 102 uses the generation rule A. That is, according to the generation rule A, the authentication symbol string generation unit 102 generates a new authentication symbol string based on at least a part of the authentication symbol string stored in the first authentication symbol string storage unit 100.

Meanwhile, for example, if generation rule information such as is shown in FIG. 15 is stored in the first generation rule information storage unit 116, the authentication symbol string generation unit 102 uses a generation rule correlated to the type of a symbol at a predetermined position (for example, at the head position) in the authentication symbol string stored in the first authentication symbol string storage unit 100. For example, when the symbol at a predetermined position (for example, at the head position) in the authentication symbol string stored in the first authentication symbol string storage unit 100 belongs to the group A, the authentication symbol string generation unit 102 uses the generation rule A.

The determination unit 204 specifies a generation rule corresponding to the authentication symbol string stored in the second authentication symbol string storage unit 200 so as to be correlated to the terminal ID received by the authentication information receiving unit 202, based on the generation rule information stored in the second generation rule information storage unit 210. Then, the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the specified generation rule".

For example, if generation rule information such as is shown in FIG. 14 is stored in the second generation rule information storage unit 210, the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the generation rule correlated to the length of the authentication symbol string stored in the second authentication symbol string storage unit 200 so as to be correlated to the terminal ID received by the authentication information receiving unit 202".

For example, when the length (x) of the authentication symbol string stored in the second authentication symbol string storage unit 200 so as to be correlated to the terminal ID received by the authentication information receiving unit 202 satisfies "x<Xa", the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the generation rule A".

Meanwhile, for example, if generation rule information such as is shown in FIG. 15 is stored in the second generation rule information storage unit 210, the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the generation rule correlated to the type of a symbol at a predetermined position in the authentication symbol string stored in the second authentication symbol string storage unit 200 so as to be correlated to the terminal ID received by the authentication information receiving unit 202".

For example, when the symbol at a predetermined position in the authentication symbol string stored in the second authentication symbol string storage unit 200 so as to be correlated to the terminal ID received by the authentication information receiving unit 202 belongs to the symbol group A, the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the generation rule A".

Note that the functional blocks other than the first generation rule information storage unit 116, the second generation rule information storage unit 210, the authentication symbol string generation unit 102, and the determination unit 204 are similar to those in the first embodiment.

Below, processing executed in the content or application providing system 1 according to the second embodiment will be described. In the content or application providing system 1 according to the second embodiment as well, processing similar to those shown in FIGS. 2, 4, 10, and 11 (or FIG. 12) is executed.

However, at step S301 in FIG. 10, the control unit of the terminal device 10 specifies a generation rule correlated to the authentication symbol string stored in the auxiliary storage unit of the terminal device 10, based on the generation rule information stored in the storage unit of the terminal device 10, and uses the generation rule specified. When generation rule information such as is shown in FIG. 14 is stored, the control unit uses the generation rule correlated to the length of the authentication symbol string stored in the auxiliary storage unit. Meanwhile, for example, when generation rule information such as is shown in FIG. 15 is stored, the control unit uses the generation rule correlated to the type of a symbol at a predetermined position in the authentication symbol string stored in the auxiliary storage unit.

Further, at step S304 in FIG. 10, the control unit of the server device 22 specifies a generation rule correlated to the authentication symbol string obtained at step S303, based on the generation rule information stored in the auxiliary storage unit of the server device 22 (or the database 24). Then, the control unit determines whether or not the authentication symbol string received at step S302 corresponds to "an authentication symbol string that can be generated based on at least a part of the authentication symbol string obtained at step S303, according to the specified generation rule".

For example, when generation rule information such as is shown in FIG. 14 is stored, the control unit determines whether or not the authentication symbol string received at step S302 corresponds to "an authentication symbol string that can be generated based on the authentication symbol string obtained at step S303, according to the generation rule correlated to the length of the authentication symbol string obtained at step S303".

Further, for example, when generation rule information such as is shown in FIG. 15 is stored, the control unit determines whether or not the authentication symbol string received at step S302 corresponds to "an authentication symbol string that can be generated based on the authentication symbol string obtained at step S303, according to the generation rule correlated to the type of a symbol at a predetermined position in the authentication symbol string obtained at step S303".

According to the content or application providing system 1 according to the second embodiment described above, it is possible to change the generation rule for generating a new authentication symbol string. According to the content or application providing system 1 according to the second embodiment, it is possible to enhance difficulty in prediction of an authentication symbol string. That is, according to the content or application providing system 1 according to the second embodiment, it is possible to make it more difficult for a person trying to illegally use content or an application to predict an authentication symbol string.

Third Embodiment

A content or application providing system according to a third embodiment of the present invention will be described. An overall structure of a content or application providing system 1 according to the third embodiment is similar to that in the first embodiment. In the following, as to a content or application providing system 1 according to the third embodiment, a difference from the first embodiment will be described.

A content or application providing system 1 according to the third embodiment changes the generation rule for gendering a new authentication symbol string, based on the number of times (frequency) at which an authentication symbol string has been updated. In the following, a structure for implementing such a function will be described.

Figure 16:
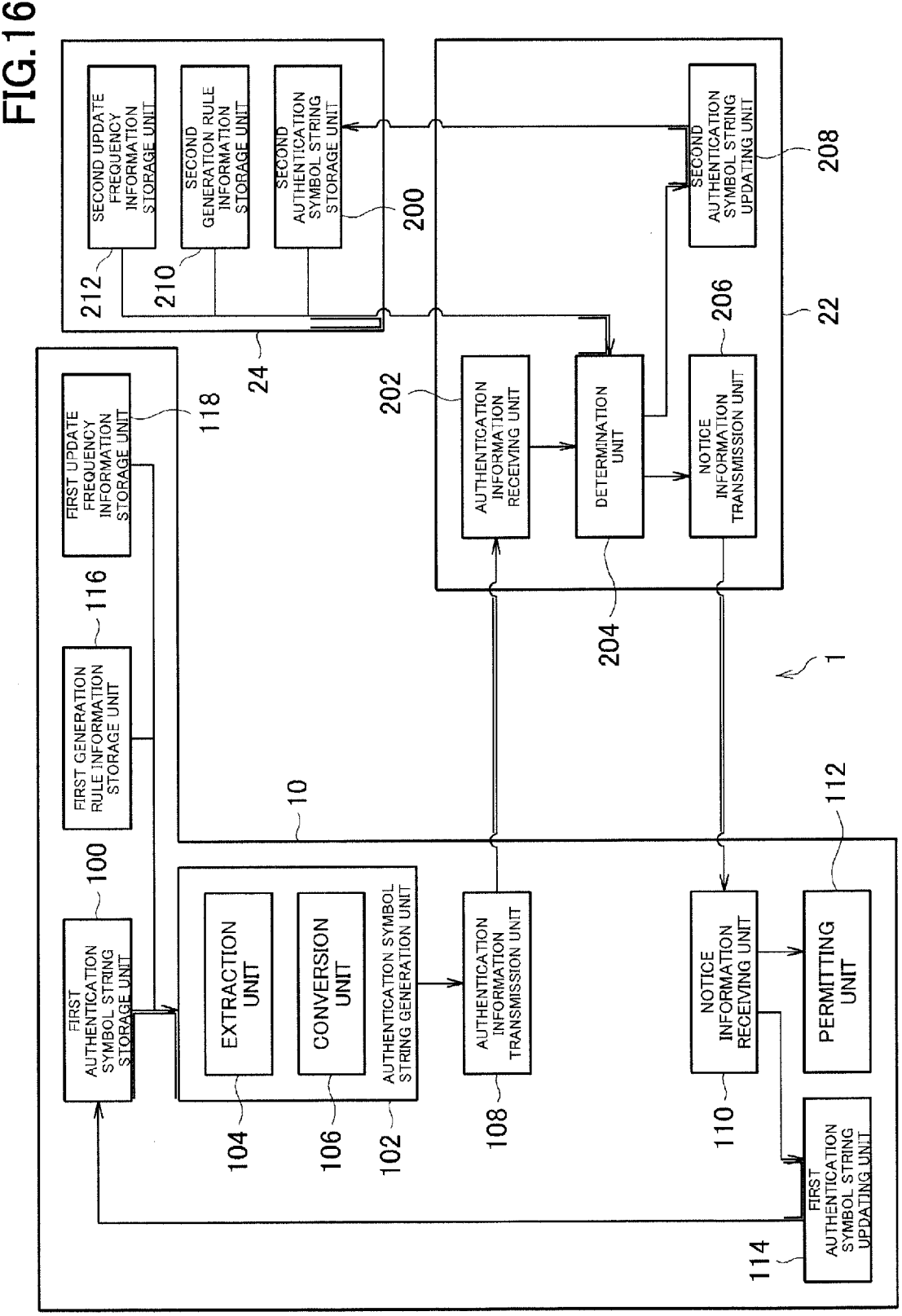
FIG. 16 is a functional block diagram of a content or application providing system according to a third embodiment.

FIG. 16 shows a functional block relevant to the present invention among those that are implemented in the content or application providing system 1 according to the third embodiment.

As shown in FIG. 16, the content or application providing system 1 according to the third embodiment differs from the first embodiment in that the former includes a first generation rule information storage unit 116, a first update frequency information storage unit 118, a second generation rule information storage unit 210, and a second update frequency information storage unit 212. For example, the first generation rule information storage unit 116 and the first update frequency information storage unit 118 are implemented using the auxiliary storage unit of the terminal device 10. The second generation rule information storage unit 210 and the second update frequency information storage unit 212 are implemented using the auxiliary storage unit of the server device 22 or the database 24.

The first update frequency information storage unit 118 stores update frequency information regarding the number of times at which the authentication symbol string stored in the first authentication symbol string storage unit 100 has been updated by the first authentication symbol string updating unit 114. FIG. 17 shows one example of the update frequency information stored in the first update frequency information storage unit 118.

The first generation rule information storage unit 116 stores generation rule information. Generation rule information is information for correlating the number of time (or frequency) at which an authentication symbol string has been updated and a generation rule for generating a new authentication symbol string based on an authentication symbol string. FIG. 18 shows one example of the generation rule information. In the generation rule information shown in FIG. 18, a generation rule for generating an authentication symbol string is correlated to a range of the number of times at which an authentication symbol string has been updated. In FIG. 18, "Ya" refers to a predetermined value. The "generation rule A" and the "generation rule B" are different rules from each other, being, for example, similar to those shown in FIGS. 14 and 15.

The authentication symbol string generation unit 102 specifies a generation rule correlated to the frequency information stored in the first update frequency information storage unit 118, based on the generation rule information stored in the first generation rule information storage unit 116. Then, the authentication symbol string generation unit 102 uses that generation rule. That is, according to that generation rule, the authentication symbol string generation unit 102 generates a new authentication symbol string based on at least a part of the authentication symbol string stored in the first authentication symbol string storage unit 100.

For example, when generation rule information such as is shown in FIG. 18 is stored in the first generation rule information storage unit 116 and the update frequency (y) indicated by the update frequency information stored in the first update frequency information storage unit 118 satisfies "y<Ya", the authentication symbol string generation unit 102 uses the generation rule A. That is, according to the generation rule A, the authentication symbol string generation unit 102 generates a new authentication symbol string based on at least a part of the authentication symbol string stored in the first authentication symbol string storage unit 100.

The second update frequency information storage unit 212 stores so as to be correlated to a terminal ID, update frequency information regarding the number of times at which the authentication symbol string stored in the second authentication symbol string storage unit 200 so as to be correlated to that terminal ID has been updated by the second authentication symbol string updating unit 208. For example, in the third embodiment, a terminal table such as is shown in FIG. 19 is stored. The terminal table shown in FIG. 19 differs from the terminal table shown in FIG. 6 in that the former includes an "update frequency information" field. In the "update frequency information" field, update frequency information regarding the number of times at which an authentication symbol string stored so as to be correlated to a terminal ID has been updated is stored.

Note that, on principle, in the second update frequency information storage unit 212 (terminal table), the update frequency information stored in the first update frequency information storage unit 118 of the terminal device 10 is stored so as to be correlated to the terminal ID of the terminal device 10. That is, for example, the update frequency information (twice) stored in the first update frequency information storage unit 118 of the terminal device 10 having the terminal ID "T00001" is stored in the second update frequency information storage unit 212 (terminal table) so as to be correlated to the terminal ID "T00001".

The second generation rule information storage unit 210 stores the generation rule information stored in the first generation rule information storage unit 116.

The determination unit 204 specifies a generation rule correlated to the update frequency information stored in the second update frequency information storage unit 212 so as to be correlated to the terminal ID received by the authentication information receiving unit 202, based on the generation rule information stored in the second generation rule information storage unit 210. Then, the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the specified generation rule".

For example, when generation rule information such as is shown in FIG. 17 is stored in the second generation rule information storage unit 210 and the update frequency (y) indicated by the update frequency information stored in the second update frequency information storage unit 212 so as to be correlated to the terminal ID received by the authentication information receiving unit 202 satisfies "y<Ya", the determination unit 204 determines whether or not the authentication symbol string received by the authentication information receiving unit 202 belongs to the type of "an authentication symbol string that can be generated based on at least a part of the authentication symbol string stored in the second authentication symbol string storage unit 200 so as to be correlated to the terminal ID received by the authentication information receiving unit 202, according to the generation rule A".

Note that the functional blocks other than the first generation rule information storage unit 116, the second generation rule information storage unit 210, the authentication symbol string generation unit 102, and the determination unit 204 are similar to those in the first embodiment.

Below, processing executed in the content or application providing system 1 according to the third embodiment will be described. In the content or application providing system 1 according to the third embodiment as well, processing similar to that shown in FIGS. 2, 4, 10, and 11 (or FIG. 12) is executed.

However, at step S207 in FIG. 4, the control unit of the terminal device 10 stores an authentication symbol string in the auxiliary storage unit (the first authentication symbol string storage unit 100) of the terminal device 10 and initializes the update frequency information stored in the auxiliary storage unit (the first update frequency information storage unit 118) of the terminal device 10 to the initial value (for example, 0). Further, at step S208, the control unit of the server device 22 adds a new record to the terminal table, and registers the user ID, terminal ID, and authentication symbol string received at step S206 to the respective "user ID", "terminal ID", and "authentication symbol string" fields of the new record, and further, the initial value (for example, 0) in the "update frequency information" field.

Further, at step S301 in FIG. 10, the control unit of the terminal device 10 specifies a generation rule correlated to the update frequency information stored in the storage unit of the terminal device 10, based on the generation rule information, and uses the generation rule.

Further, at step S304 in FIG. 10, the control unit of the server device 22 accesses the terminal table to obtain the update frequency information stored so as to be correlated to the terminal ID received at step S302. Then, the control unit determines whether or not the authentication symbol string received at step S302 corresponds to "an authentication symbol string that can be generated based on at least a part of the authentication symbol string obtained at step S303, according to the generation rule correlated to the obtained update frequency information".

Further, at step S307 in FIG. 10, the control unit of the terminal device 10 updates the authentication symbol string stored in the auxiliary storage unit (the first authentication symbol string storage unit 100) of the terminal device 10, and increases by one the update frequency information stored in the auxiliary storage unit (the first update frequency information storage unit 118) of the terminal device 10. Similarly, at step S310, the control unit of the server device 22 updates the authentication symbol string stored in the terminal table (the second authentication symbol string storage unit 200) so as to be correlated to the terminal ID, and increases by one the update frequency information stored in the terminal table (the second update frequency information storage unit 212) so as to be correlated to the terminal ID.

Further, at step S405 in FIG. 11, the control unit of the server device 22 obtains the authentication symbol string stored so as to be correlated to the terminal ID, and obtains the update frequency information stored so as to be correlated to the terminal ID. Then, at step S406, the control unit sends the update frequency information to the terminal device 10 together with the authentication symbol string. Further, at step S407, the control unit of the terminal device 10 updates the authentication symbol string stored in the auxiliary storage unit to the received authentication symbol string, and updates the update frequency information stored in the auxiliary storage unit to the received update frequency information.

Note that at step S405 in FIG. 11, the control unit of the server device 22 may obtain the authentication symbol string stored so as to be correlated to the terminal ID, and update the update frequency information stored so as to be correlated to the terminal ID to the initial value (for example, 0). Then, at step S407, the control unit of the terminal device 10 may update the authentication symbol string stored in the auxiliary storage unit to the received authentication symbol string, and updates the update frequency information stored in the auxiliary storage unit to the initial value (for example, 0).

Further, at step S507 in FIG. 12, the control unit of the terminal device 10 obtains the authentication symbol string stored in the auxiliary storage unit, and obtains also the update frequency information stored in the auxiliary storage unit. Then, at step S508, the control unit sends the update frequency information to the server device 22 together with the terminal ID and the authentication symbol string. Further, at step S509, the control unit of the server device 22 updates the authentication symbol string stored so as to be correlated to the terminal ID to the received authentication symbol string, and updates the update frequency information stored so as to be correlated to the terminal ID to the received update frequency information.

Note that at step S507 in FIG. 12, the control unit of the terminal device 10 may obtain the authentication symbol string stored in the auxiliary storage unit, and updates the update frequency information stored in the auxiliary storage unit to the initial value (for example, 0). Then, at step S509, the control unit of the server device 22 may update the authentication symbol string stored so as to be correlated to the terminal ID to the received authentication symbol string, and update the update frequency information stored so as to be correlated to the terminal ID to the initial value (for example, 0).

According to the content or application providing system 1 according to the third embodiment described above, similar to the content or application providing system 1 according to the second embodiment, it is possible to change the generation rule for generating a new authentication symbol string. According to the content or application providing system 1 according to the third embodiment, it is possible to enhance difficulty in prediction of an authentication symbol string. That is, according to the content or application providing system 1 according to the third embodiment, it is possible to make it more difficult for a person trying to illegally use content to predict an authentication symbol string.

Note that the present invention is not limited to the above-described first to third embodiments.

[1] For example, in the processing shown in FIG. 11, the authentication symbol string stored in the auxiliary storage unit of the terminal device 10 is updated to the authentication symbol string stored in the database 24 (the terminal table) so as to be correlated to the terminal ID of the terminal device 10 (see steps S405 to S407 in FIG. 11).

However, the authentication symbol string stored in the auxiliary storage unit of the terminal device 10 may be updated to a symbol string other than the authentication symbol string stored in the database 24 (the terminal table) so as to be correlated to the terminal ID of the terminal device 10.

At step S405 in FIG. 11, for example, instead of obtaining the authentication symbol string stored in the terminal table so as to be correlated to the terminal ID, an updating symbol string (in other words, an initializing symbol string) may be generated. For example, an updating symbol string may be generated at random. For example, the length of an updating symbol string may be determined at random, and the respective symbols constituting the updating symbol string as well may be determined at random. Then, at step S406, the generated updating symbol string is sent to the terminal device 10, and at step S407, the authentication symbol string stored in the auxiliary storage unit of the terminal device 10 may be updated to the updating symbol string.

Note that in the server device 22 in this case, after the processing at step S405 (and S406) executed, the authentication symbol string stored in the terminal table so as to be correlated to the terminal ID received at step S402 is updated to the generated updating symbol string.

In this manner as well, when a situation is resulted, due to deficiency or the like caused to the communication network 2, in which the authentication symbol string stored in the terminal device 10 does not coincide with that in the server device 22, an authentic user can initialize the situation so that the authentication symbol string stored in the terminal device 10 coincides with that in the server device 22. As a result, it is possible to ensure that an authentic user can use content.

[2] Further, for example, in the processing shown in FIG. 12, the authentication symbol string stored in the database 24 (the terminal table) so as to be correlated to the terminal ID of the terminal device 10 is updated to the authentication symbol string stored in the auxiliary storage unit of the terminal device 10 (see steps S507 to S509 in FIG. 12).

However, the authentication symbol string stored in the database 24 (terminal table) so as to be correlated to the terminal ID of the terminal device 10 may be updated to a symbol string other than the authentication symbol string stored in the auxiliary storage unit of the terminal device 10.

For example, at step S507 in FIG. 12, instead of obtaining the authentication symbol string stored in the terminal table so as to be correlated to the terminal ID, an updating symbol string (in other words, an initializing symbol string) may be generated. An updating symbol string may be generated at random. For example, the length of an updating symbol string may be determined at random, and the respective symbols constituting the updating symbol string may be determined at random. Then, at step S508, the generated updating symbol string is sent to the server device 22 together with the terminal ID, and at step S509, the authentication symbol string stored in the database 24 (terminal table) so as to be correlated to the terminal ID may be updated to the updating symbol string.

Note that in the terminal device 10 in this case, after the processing at step S507 (and S508) executed, the authentication symbol string stored in the auxiliary storage unit is updated to the generated updating symbol string.

In this manner as well, when a situation is resulted, due to deficiency or the like caused to the communication network 2, in which the authentication symbol string stored in the terminal device 10 does not coincide with that in the server device 22, an authentic user can initialize the situation so that the authentication symbol string stored in the terminal device 10 coincides with that in the server device 22. As a result, it is ensured that an authentic user can use content or an application.

The invention claimed is:

1. A system for providing content or an application including a terminal device for a user to use the content or the application and an authentication system, wherein
the terminal device includes
at least one first memory operable to store first program code;
at least one first processor operable to read said first program code and operate as instructed by said first program code, said first program code including:
authentication symbol string generation code that causes the at least one first processor to generate a new authentication symbol string based on at least a part of an authentication symbol string stored in a first authentication symbol string storage, according to a generation rule for generating a new authentication symbol string based on an authentication symbol string, and authentication information transmission code that causes the at least one first processor to send terminal identification information for identifying the terminal device and the new authentication symbol string generated by the authentication symbol string generation code to the authentication system, the terminal identification information being unique to each terminal device, the authentication system includes
at least one second memory operable to store second program code;
at least one second processor operable to read said second program code and operate as instructed by said second program code, said second program code including:
authentication information receiving code that causes the at least one second processor to receive the terminal identification information and the new authentication symbol string sent by the authentication information transmission code,
determination code that causes the at least one second processor to determine whether or not the new authentication symbol string received by the authentication information receiving code belongs to a type of an authentication symbol string that is able to be generated, according to the generation rule, based on at least a part of an authentication symbol string stored in a second authentication symbol string storage so as to be correlated to the terminal identification information received by the authentication information receiving code,
notice information transmission code that causes the at least one second processor to send notice information for permitting use of the content or the application in the terminal device to the terminal device in a case where it is determined that the new authentication symbol string received by the authentication information receiving code belongs to the type, and
second authentication symbol string update code that causes the at least one second processor to update the authentication symbol string stored in the second authentication symbol string storage so as to be correlated to the terminal identification information received by the authentication information receiving code to the new authentication symbol string received by the authentication information receiving code, in the case where it is determined that the new authentication symbol string received by the authentication information receiving code belongs to the type, said first program code further includes
notice information receiving code that causes the at least one first processor to receive the notice information sent by the notice information transmission code,
permitting code that causes the at least one first processor to permit use of the content or the application, based on the notice information received by the notice information receiving code, and
first authentication symbol string update code that causes the at least one first processor to update the authentication symbol string stored in the first authentication symbol string storage to the new authentication symbol string generated by the authentication symbol string generation code, in the case where it is determined that the new authentication symbol string received by the authentication information receiving code belongs to the type.

2. The system for providing the content or the application according to claim 1,
wherein
the authentication symbol string generation code causes the at least one first processor to:
specify a generation rule correlated to the authentication symbol string stored in the first authentication symbol string storage, based on generation rule information stored in a first generation rule information storage, the generation rule information being information for correlating information on an authentication symbol string and a generation rule for generating a new authentication symbol string based on an authentication symbol string, and
generate the new authentication symbol string based on at least a part of the authentication symbol string stored in the first authentication symbol string storage, according to the specified generation rule,
and
the determination code causes the at least one second processor to:
specify a generation rule correlated to the authentication symbol string stored in the second authentication symbol string storage, based on generation rule information stored in a second generation rule information storage, the second generation rule information storage storing the generation rule information stored in the first generation rule information storage, and
determine whether or not the new authentication symbol string received by the authentication information receiving code belongs to a type of an authentication symbol string that is able to be generated, according to the specified generation rule, based on at least a part of the authentication symbol string stored in the second authentication symbol string storage so as to be correlated to the terminal identification information received by the authentication information receiving code.

3. The system for providing the content or the application according to claim 2,
wherein
the generation rule information is information for correlating a length of an authentication symbol string and a generation rule for generating a new authentication symbol string based on an authentication symbol string,
the authentication symbol string generation code causes the at least one first processor to generate the new authentication symbol string based on at least a part of the authentication symbol string stored in the first authentication symbol string storage, according to a generation rule correlated to a length of the authentication symbol string stored in the first authentication symbol string storage, and
the determination code causes the at least one second processor to determine whether or not the new authentication symbol string received by the authentication information receiving code belongs to a type of an authentication symbol string that is able to be generated, according to a generation rule correlated to a length of the authentication symbol string stored in the second authentication symbol string storage, based on at least a part of the authentication symbol string stored in the second authentication symbol string storage so as to be correlated to the terminal identification information received by the authentication information receiving code.

4. The system for providing the content or the application according to claim 3, wherein
said first program code further includes
code that causes the at least one first processor to guide the user to input user identification information for identifying the user and a user password, and
code that causes the at least one first processor to send the user identification information and the user password input by the user to the authentication system,
said second program code further includes
code that causes the at least one second processor to determine whether or not the combination of the user identification information and the user password sent from the terminal device is any of combinations of user identification information and a user password stored in a user authentication information storage, and
the authentication system sets the authentication symbol string stored in the first authentication symbol string storage and the authentication symbol string stored in the second authentication symbol string storage so as to be correlated to terminal identification information correlated to the user identification information sent from the terminal device, to a same authentication symbol string, in a case where it is determined that the combination of the user identification information and the user password sent from the terminal device is any of the combinations stored in the user authentication information storage.

5. The system for providing the content or the application according to claim 2, wherein
the generation rule information is information for correlating a type of a symbol at a predetermined position in an authentication symbol string and a generation rule for generating a new authentication symbol string based on an authentication symbol string,
the authentication symbol string generation code causes the at least one first processor to generate the new authentication symbol string based on at least a part of the authentication symbol string stored in the first authentication symbol string storage, according to a generation rule correlated to a type of a symbol at the predetermined position in the authentication symbol string stored in the first authentication symbol string storage, and
the determination code causes the at least one second processor to determine whether or not the new authentication symbol string received by the authentication information receiving code belongs to a type of an authentication symbol string that is able to be generated, according to a generation rule correlated to a type of a symbol at the predetermined position in the authentication symbol string stored in the second authentication symbol string storage, based on at least a part of the authentication symbol string stored in the second authentication symbol string storage.

6. The system for providing the content or the application according to claim 5, wherein
said first program code further includes
code that causes the at least one first processor to guide the user to input user identification information for identifying the user and a user password, and
code that causes the at least one first processor to send the user identification information and the user password input by the user to the authentication system,
said second program code further includes
code that causes the at least one second processor to determine whether or not the combination of the user identification information and the user password sent from the terminal device is any of combinations of user identification information and a user password stored in a user authentication information storage, and
the authentication system sets the authentication symbol string stored in the first authentication symbol string storage and the authentication symbol string stored in the second authentication symbol string storage so as to be correlated to terminal identification information correlated to the user identification information sent from the terminal device, to a same authentication symbol string, in a case where it is determined that the combination of the user identification information and the user password sent from the terminal device is any of the combinations stored in the user authentication information storage.

7. The system for providing the content or the application according to claim 2, wherein
said first program code further includes
code that causes the at least one first processor to guide the user to input user identification information for identifying the user and a user password, and
code that causes the at least one first processor to send the user identification information and the user password input by the user to the authentication system,
said second program code further includes
code that causes the at least one second processor to determine whether or not the combination of the user identification information and the user password sent from the terminal device is any of combinations of user identification information and a user password stored in a user authentication information storage, and
the authentication system sets the authentication symbol string stored in the first authentication symbol string storage and the authentication symbol string stored in the second authentication symbol string storage so as to be correlated to terminal identification information correlated to the user identification information sent from the terminal device, to a same authentication symbol string, in a case where it is determined that the combination of the user identification information and the user password sent from the terminal device is any of the combinations stored in the user authentication information storage.

8. The system for providing the content or the application according to claim 1, wherein
said first program code further includes
code that causes the at least one first processor to guide the user to input user identification information for identifying the user and a user password, and
code that causes the at least one first processor to send the user identification information and the user password input by the user to the authentication system,
said second program code further includes
code that causes the at least one second processor to determine whether or not the combination of the user identification information and the user password sent from the terminal device is any of combinations of user identification information and a user password stored in a user authentication information storage, and the authentication system sets the authentication symbol string stored in the first authentication symbol string storage and the authentication symbol string stored in the second authentication symbol string storage so as to be correlated to terminal identification information correlated to the user identification information sent from the terminal device, to a same authentication symbol string, in a case where it is determined that the combination of the user identification information and the user password sent from the terminal device is any of the combinations stored in the user authentication information storage.

9. The system for providing the content or the application according to claim 1,
wherein
the authentication symbol string generation code causes the at least one first processor to:
specify a generation rule correlated to update frequency information stored in a first update frequency information storage, based on generation rule information stored in a first generation rule information storage, the update frequency information being information concerning a number of times at which the authentication symbol string stored in the first authentication symbol string storage is updated, the generation rule information being information for correlating a number of times at which an authentication symbol string is updated and a generation rule for generating a new authentication symbol string based on an authentication symbol string, and
generate the new authentication symbol string based on at least a part of the authentication symbol string stored in the first authentication symbol string storage, according to the specified generation rule, and
the determination code causes the at least one second processor to:
specify a generation rule correlated to update frequency information stored in a second update frequency information storage so as to be correlated to the terminal identification information received by the authentication information receiving code, based on the generation rule information stored in a second generation rule information storage, the update frequency information being information concerning a number of times at which the authentication symbol string stored in the second authentication symbol string storage so as to be correlated to the terminal identification information is updated, and
determine whether or not the new authentication symbol string received by the authentication information receiving code belongs to a type of an authentication symbol string that is able to be generated, according to the specified generation rule, based on at least a part of the authentication symbol string stored in the second authentication symbol string storage.

10. The system for providing the content or the application according to claim 9, wherein
said first program code further includes
code that causes the at least one first processor to guide the user to input user identification information for identifying the user and a user password, and
code that causes the at least one first processor to send the user identification information and the user password input by the user to the authentication system, said second program code further includes
code that causes the at least one second processor to determine whether or not the combination of the user identification information and the user password sent from the terminal device is any of combinations of user identification information and a user password stored in a user authentication information storage, and the authentication system sets the authentication symbol string stored in the first authentication symbol string storage and the authentication symbol string stored in the second authentication symbol string storage so as to be correlated to terminal identification information correlated to the user identification information sent from the terminal device, to a same authentication symbol string, and sets the update frequency information stored in the first update frequency information storage and the update frequency information stored in the second update frequency information storage so as to be correlated to the terminal identification information correlated to the user identification information sent from the terminal device, to a same update frequency, in a case where it is determined that the combination of the user identification information and the user password sent from the terminal device is any of the combinations stored in the user authentication information storage.

11. The system for providing the content or the application according to claim 9, wherein
the generation rule includes a rule in which a symbol at which position in an authentication symbol string is to be extracted, and
the authentication symbol string generation code includes extraction code that causes the at least one first processor to extract, according to the generation rule, one or more symbols from the authentication symbol string stored in the first authentication symbol string storage, and the authentication symbol string generation code causes the at least one first processor to generate the new authentication symbol string based on the one or more symbols extracted by the extraction code.

12. The system for providing the content or the application according to claim 9, wherein
the generation rule includes at least one of a rule for converting one symbol in an authentication symbol string into one symbol, a rule for converting one symbol in an authentication symbol string into a plurality of symbols, a rule for converting a plurality of symbols in an authentication symbol string to one symbol, and a rule for converting a plurality of symbols in an authentication symbol string into a plurality of symbols, and
the authentication symbol string generation code includes conversion code that causes the at least one first processor to convert at least a part of the authentication symbol string stored in the first authentication symbol string storage according to the generation rule to obtain one or more symbols, and the authentication symbol string generation code causes the at least one first processor to generate the new authentication symbol string based on the one or more symbols obtained by the conversion code.

13. The system for providing the content or the application according to claim 9, wherein
the generation rule includes a rule in which one or more symbols based on at least a part of an authentication symbol string is/are to be included in which position in the new authentication symbol string, and the authentication symbol string generation code causes the at least one first processor to generate, according to the generation rule, a symbol string including one or more symbols based on at least a part of the authentication symbol string stored in the first authentication symbol string storage as the new authentication symbol string.

14. The system for providing the content or the application according to claim 1, wherein
the generation rule includes a rule in which a symbol at which position in an authentication symbol string is to be extracted, and
the authentication symbol string generation code includes extraction code that causes the at least one first processor to extract, according to the generation rule, one or more symbols from the authentication symbol string stored in the first authentication symbol string storage, and the authentication symbol string generation code causes the at least one first processor to generate the new authentication symbol string based on the one or more symbols extracted by the extraction code.

15. The system for providing the content or the application according to claim 1, wherein
the generation rule includes at least one of a rule for converting one symbol in an authentication symbol string into one symbol, a rule for converting one symbol in an authentication symbol string into a plurality of symbols, a rule for converting a plurality of symbols in an authentication symbol string to one symbol, and a rule for converting a plurality of symbols in an authentication symbol string into a plurality of symbols, and
the authentication symbol string generation code includes conversion code that causes the at least one first processor to convert at least a part of the authentication symbol string stored in the first authentication symbol string storage according to the generation rule to obtain one or more symbols, and the authentication symbol string generation code causes the at least one first processor to generate the new authentication symbol string based on the one or more symbols obtained by the conversion code.

16. The system for providing the content or the application according to claim 1, wherein
the generation rule includes a rule in which one or more symbols based on at least a part of an authentication symbol string is/are to be included in which position in the new authentication symbol string, and
the authentication symbol string generation code causes the at least one first processor to generate, according to the generation rule, a symbol string including one or more symbols based on at least a part of the authentication symbol string stored in the first authentication symbol string storage as the new authentication symbol string.

17. The system for providing the content or the application according to claim 1, wherein
the terminal identification information and the authentication symbol string so as to be correlated to the terminal identification information string are used after authentication of the user.

18. A control method for a system for providing content or an application including a terminal device for a user to use the content or the application and an authentication system, comprising:
a step of obtaining by the terminal device, an authentication symbol string stored in a first authentication symbol string storage;
an authentication symbol string generation step of generating by the terminal device, a new authentication symbol string based on at least a part of the authentication symbol string stored in the first authentication symbol string storage, according to a generation rule for generating a new authentication symbol string based on an authentication symbol string;
an authentication information transmission step of sending by the terminal device, terminal identification information for identifying the terminal device and the new authentication symbol string generated at the authentication symbol string generation step to the authentication system, the terminal identification information being unique to each terminal device;
a step of obtaining by the authentication system, at least a part of content stored in a second authentication symbol string storage that stores an authentication symbol string so as to be correlated to the terminal identification information;
an authentication information receiving step of receiving by the authentication system, the terminal identification information and the new authentication symbol string sent at the authentication information transmission step;
a determination step of determining by the authentication system, whether or not the new authentication symbol string received at the authentication information receiving step belongs to a type of an authentication symbol string that is able to be generated, according to the generation rule, based on at least a part of the authentication symbol string stored in the second authentication symbol string storage so as to be correlated to the terminal identification information received at the authentication information receiving step;
a notice information transmission step of sending by the authentication system, notice information for permitting use of the content or the application in the terminal device to the terminal device in a case where it is determined at the determination step that the new authentication symbol string received at the authentication information receiving step belongs to the type;
a second authentication symbol string update step of updating by the authentication system, the authentication symbol string stored in the second authentication symbol string storage so as to be correlated to the terminal identification information received at the authentication information receiving step to the new authentication symbol string received at the authentication information receiving step, in the case where it is determined at the determination step that the new authentication symbol string received at the authentication information receiving step belongs to the type;
a notice information receiving step of receiving by the terminal device, the notice information sent at the notice information transmission step;
a permitting step of permitting by the terminal device, use of the content or the application, based on the notice information received at the notice information receiving step; and
a first authentication symbol string update step of updating by the terminal device, the authentication symbol string stored in the first authentication symbol string storage to the new authentication symbol string generated at the authentication symbol string generation step, in the case where it is determined at the determination step that the new authentication symbol string received at the authentication information receiving step belongs to the type.

19. A terminal device for a user to use content or an application, connected for communication to an authentication system, comprising:
  at least one memory operable to store program code;
  at least one processor operable to read said program code and operate as instructed by said program code, said program code including:
    authentication symbol string generation code that causes the at least one processor to generate a new authentication symbol string based on at least a part of an authentication symbol string stored in an authentication symbol string storage, according to a generation rule for generating a new authentication symbol string based on an authentication symbol string;
    authentication information transmission code that causes the at least one processor to send terminal identification information for identifying the terminal device and the new authentication symbol string generated by the authentication symbol string generation code to the authentication system, the terminal identification information being unique to each terminal device;
    code that causes the at least one processor to receive notice information sent from the authentication system in a case where it is determined in the authentication system that the new authentication symbol string sent by the authentication information transmission code belongs to a type of an authentication symbol string that is able to be generated, according to the generation rule, based on at least a part of an authentication symbol string stored in the authentication system so as to be correlated to the terminal identification information sent by the authentication information transmission code;
    permitting code that causes the at least one processor to permit use of the content or the application, based on the notice information; and
    authentication symbol string update code that causes the at least one processor to update the authentication symbol string stored in the authentication symbol string storage to the new authentication symbol string generated by the authentication symbol string generation code in the case where it is determined in the authentication system that the new authentication symbol string sent by the authentication information transmission code belongs to the type.

20. A control method for a terminal device for a user to use content or an application, connected for communication to an authentication system, the control method comprising:
  a step of obtaining an authentication symbol string stored in an authentication symbol string storage;
  an authentication symbol string generation step of generating a new authentication symbol string based on at least a part of the authentication symbol string stored in the authentication symbol string storage, according to a generation rule for generating a new authentication symbol string based on an authentication symbol string;
  an authentication information transmission step of sending terminal identification information for identifying the terminal device and the new authentication symbol string generated at the authentication symbol string generation step to the authentication system, the terminal identification information being unique to each terminal device;
  a step of receiving notice information sent from the authentication system in a case where it is determined in the authentication system that the new authentication symbol string sent at the authentication information transmission step belongs to a type of an authentication symbol string that is able to be generated, according to the generation rule, based on at least a part of an authentication symbol string stored in the authentication system so as to be correlated to the terminal identification information sent at the authentication information transmission step;
  a permitting step of permitting use of the content or the application, based on the notice information; and
  an authentication symbol string update step of updating the authentication symbol string stored in the authentication symbol string storage to the new authentication symbol string generated at the authentication symbol string generation step in the case where it is determined in the authentication system that the new authentication symbol string sent at the authentication information transmission step belongs to the type.

21. An authentication device connected for communication to a terminal device for a user to use content or an application, comprising:
  at least one memory operable to store program code;
  at least one processor operable to read said program code and operate as instructed by said program code, said program code including:
    code that causes the at least one processor to obtain at least a part of content stored in an authentication symbol string storage that stores an authentication symbol string so as to be correlated to terminal identification information for identifying the terminal device, the terminal identification information being unique to each terminal device;
    authentication information receiving code that causes the at least one processor to receive from the terminal device, the terminal identification information and a new authentication symbol string, the new authentication symbol string being generated based on at least a part of an authentication symbol string stored in the terminal device, according to a generation rule for generating a new authentication symbol string based on an authentication symbol string;
    determination code that causes the at least one processor to determine whether or not the new authentication symbol string received by the authentication information receiving code belongs to a type of an authentication symbol string that is able to be generated, according to the generation rule, based on at least a part of the authentication symbol string stored in the authentication symbol string storage so as to be correlated to the terminal identification information received by the authentication information receiving code;
    notice information transmission code that causes the at least one processor to send notice information for permitting use of the content or the application in the terminal device to the terminal device in a case where it is determined that the new authentication symbol string received by the authentication information receiving code belongs to the type; and
    authentication symbol string update code that causes the at least one processor to update the authentication symbol string stored in the authentication symbol string storage so as to be correlated to the terminal identification information received by the authentication information receiving code to the new authentication symbol string received by the authentication information receiving code, in the case where it is determined that the new authentication symbol string received by the authentication information receiving code belongs to the type.

22. A control method for an authentication device connected for communication to a terminal device for a user to use content or an application, the control method comprising:
a step of obtaining at least a part of content stored in an authentication symbol string storage that stores an authentication symbol string so as to be correlated to terminal identification information for identifying the terminal device, the terminal identification information being unique to each terminal device;
an authentication information receiving step of receiving from the terminal device, the terminal identification information and a new authentication symbol string, the new authentication symbol string being generated based on at least a part of an authentication symbol string stored in the terminal device, according to a generation rule for generating a new authentication symbol string, based on an authentication symbol string;
a determination step of determining whether or not the new authentication symbol string received at the authentication information receiving step belongs to a type of an authentication symbol string that is able to be generated, according to the generation rule, based on at least a part of the authentication symbol string stored in the authentication symbol string storage so as to be correlated to the terminal identification information received at the authentication information receiving step;
a notice information transmission step of sending notice information for permitting use of the content or the application in the terminal device to the terminal device in a case where it is determined at the determination step that the new authentication symbol string received at the authentication information receiving step belongs to the type; and
an authentication symbol string update step of updating the authentication symbol string stored in the authentication symbol string storage so as to be correlated to the terminal identification information received at the authentication information receiving step to the new authentication symbol string received at the authentication information receiving step, in the case where it is determined at the determination step that the new authentication symbol string received at the authentication information receiving step belongs to the type.

* * * * *